DIGITAL ERROR CORRECTING SYSTEMS

Filed March 26, 1957

INVENTOR
W. ULRICH
BY Alan C. Rose
ATTORNEY

INVENTOR
W. ULRICH
BY Alan C. Rose
ATTORNEY

INVENTOR
W. ULRICH
BY Alan C. Rose
ATTORNEY

INVENTOR
W. ULRICH
BY Alan C. Rose
ATTORNEY

FIG. 10A
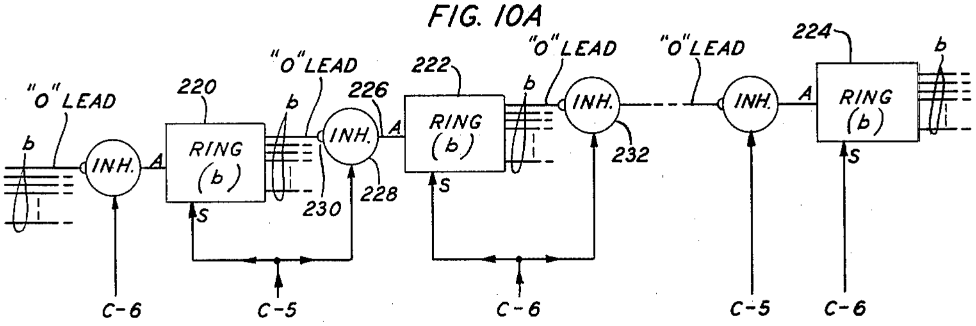
FIG. 10B
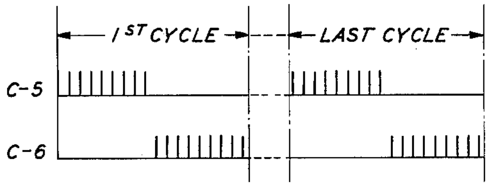
FIG. 10C
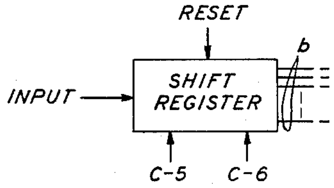
FIG. 11B
| CHARACTERISTIC GENERATOR OUTPUT SIGNALS | | |
|---|---|---|
| 1ST STAGE | 2ND STAGE | 3RD STAGE |
| 2 | 0 | 0 |
| 2 | 1 | 1 |
| 2 | 1 | 0 |
| 2 | 0 | 1 |
| 1 | 0 | 0 |
| 1 | 1 | 1 |
| 1 | 1 | 0 |
| 1 | 0 | 1 |
FIG. 11A
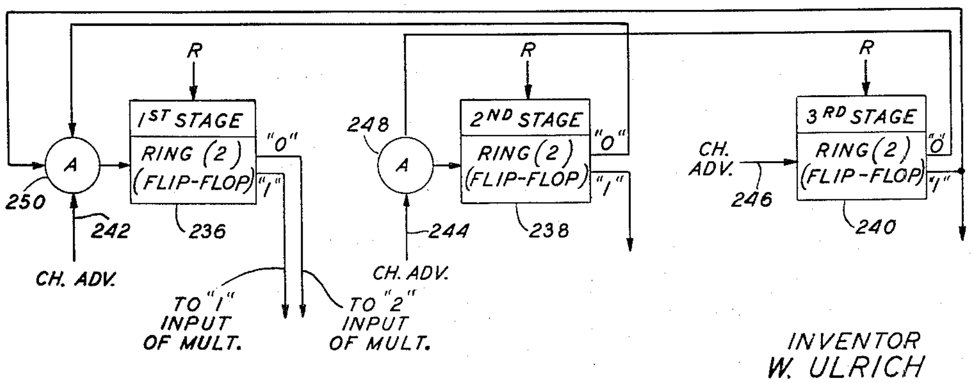
INVENTOR
W. ULRICH
BY Alan C. Rose
ATTORNEY Jan. 16, 1962 W. ULRICH 3,017,091
DIGITAL ERROR CORRECTING SYSTEMS
Filed March 26, 1957 13 Sheets-Sheet 6

INVENTOR
W. ULRICH
BY Alan C. Rose
ATTORNEY

Jan. 16, 1962 W. ULRICH 3,017,091

DIGITAL ERROR CORRECTING SYSTEMS

Filed March 26, 1957 13 Sheets-Sheet 7

INVENTOR
W. ULRICH
BY Alan C. Rose
ATTORNEY

INVENTOR
W. ULRICH
BY Alan C. Rose
ATTORNEY

Jan. 16, 1962 W. ULRICH 3,017,091

DIGITAL ERROR CORRECTING SYSTEMS

Filed March 26, 1957 13 Sheets-Sheet 9

INVENTOR
W. ULRICH
BY Alan C. Rose
ATTORNEY

DIGITAL ERROR CORRECTING SYSTEMS

Filed March 26, 1957

13 Sheets-Sheet 10

INVENTOR
W. ULRICH
BY Alan C. Rose
ATTORNEY

Jan. 16, 1962 W. ULRICH 3,017,091

DIGITAL ERROR CORRECTING SYSTEMS

Filed March 26, 1957 13 Sheets-Sheet 11

INVENTOR
W. ULRICH
BY Alan C. Rose
ATTORNEY

INVENTOR
W. ULRICH
BY Alan C. Rose
ATTORNEY

INVENTOR
W. ULRICH
BY Alan C. Rose
ATTORNEY

United States Patent Office 3,017,091
Patented Jan. 16, 1962

3,017,091

DIGITAL ERROR CORRECTING SYSTEMS

Werner Ulrich, New York, N.Y., assignor to Bell Telephone Laboratories, Incorporated, New York, N.Y., a corporation of New York Filed Mar. 26, 1957, Ser. No. 648,633
9 Claims. (Cl. 235—153)

This invention relates to digital data processing systems, and more particularly to error detection or error correction systems for digital systems such as the decimal system which have a base greater than two; the principal object of the invention is the improvement of such systems.

In the processing of digital information, errors may be readily introduced into the signal information. These errors may result from noise in a signal transmission path, from transients in the electrical circuitry, or from a variety of other sources. One means for avoiding the adverse effects of errors involves the use of extra digits for checking purposes in each code group. Thus, a simple way of providing error detection would be to send each digit twice. Error correction could be provided by sending each digit three times and correcting the received code groups on a two-out-of-three basis.

More sophisticated error detection and correction schemes for binary numbers have also been proposed. In R. W. Hamming-B. D. Holbrook Reissue Patent 23,601, issued December 23, 1952, for example, a method for detecting errors in binary code groups is disclosed in which one extra digit is employed. If the binary code group includes an odd number of digital signals representing the binary symbol "1," a check digit is added which also represents the binary symbol "1" to make an even total; if the number of "1's" is already even, the added check digit is a "0." The foregoing error detection technique is termed a "parity" check. Additional check digits which are parity checks on different sets of the information digits of the code group permit error correction by uniquely determining the erroneous digit.

It has also been proposed by Mr. M. J. E. Golay to utilize the principles disclosed above for non-binary numbers having a prime number as a base (see "Notes on Digital Coding," Proceedings of the I.R.E., June 1949, page 657). However, with the exception of a few specific cases, the use of separate information and check digits for multivalued digital systems, having bases greater than two, results in relatively inefficient and unnecessarily redundant coding systems.

Accordingly, a specific object of the invention is to increase the efficiency of such systems.

The present invention relates to checking arrangements for digital systems having a base which is greater than two. Thus, for specific example, in a system in which a code group is a decimal number, it may be desirable to transmit the sign of the number. This information may be transmitted by making another decimal number which is added to make the code group either odd or even. For error checking purposes, one or more additional check digits may also be added. Now, the nature of the information which is included in the check digits is such that it need not be expressed in decimal digits. For example, the decimal digit which indicates the sign of the number has another "degree of freedom" including five distinct states which may be employed to represent additional check information. By representing both signal and check information by a single digit, one check digit which would otherwise be required may often be eliminated.

In accordance with one feature of the invention, therefore, a digital signal encoder produces code groups including at least one signal information digit and at least one digit including both signal and check information.

Another aspect of the invention relates to encoding circuits for digital systems having a factorable, or non-prime, numeration base. The decimal and the quaternary number systems are typical examples of non-prime numeration bases which are frequently used. In the development of error detection and correction systems having a non-prime radix, it is soon discovered that errors in digits of a magnitude equal to a factor of the radix must be handled differently from errors of other magnitudes. Through the use of a check digit encoder operating on a prime number base, however, errors of all magnitudes may be corrected uniformly and with equal facility.

Accordingly, it is another feature of the invention that an input check information encoder and an output decoder operating in accordance with a prime radix are associated with a digital data link facility operating in accordance with a non-prime radix.

As indicated above, in the present systems, it is contemplated that digital code groups are applied to a digital data link and that input and output error checking circuits are provided. At the input encoder in several of the illustrative systems, each digit is "tagged" or identified by multiplication by a unique error characteristic, these error characteristics are summed, and check information indicating the sum is transmitted as part of the code group. In the output error checking circuitry, multiplication and summing processes are performed which are similar to those performed at the encoder, and an output digital error characteristic is produced. The output error characteristic may uniquely determine the nature of the error through the identification or "tag" provided by the unique error characteristic associated with each digit at the encoder. Depending on the amount of check information which is employed, the nature of the checking operation may range from simple error detection to multiple error correction.

It is another feature of the invention that one numeration base is employed in a digital data link and that a different numeration base is employed in input and output equipment for the calculation of error checking information as described in the preceding paragraph. In addition, it is often desirable that a numeration base employed in the encoder and decoder be a prime number.

It is a further feature of the invention that in systems of the types described above, errors of one unit in a multilevel code may be corrected by the use of an error characteristic associated with each digit which is different from the error characteristic or the complement of the error characteristic of every other digit of each code group, but which may be a multiple of another error characteristic.

Other objects and features and various advantages of the invention may be readily apprehended from a consideration of the following detailed description and the accompanying drawing, in which:

FIG. 10A is a circuit diagram of a shift register;

FIG. 10B is a pulse diagram showing the control pulses for the shift register of FIG. 10A;

FIG. 10C is the symbol employed to represent the shift register of FIG. 10A;

FIG. 11A shows a characteristic generator circuit;

FIG. 11B is a table showing the output signals from the circuit of FIG. 11A;

Figure 1:
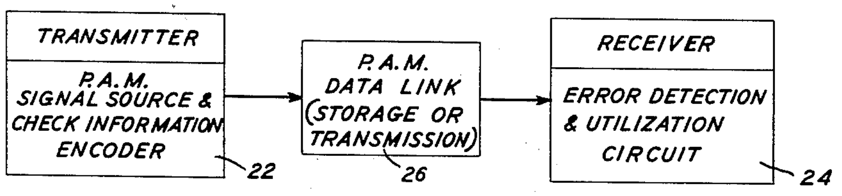
FIG. 1 is a block diagram of a digital system in accordance with the invention.

Referring more particularly to the drawings, FIG. 1 shows an information processing system in accordance with the invention. In FIG. 1, a transmitter 22 and a receiver 24 are provided for entering digital signal information into the pulse amplitude modulation data link 26, and for receiving signal information from this system.

Figure 2:
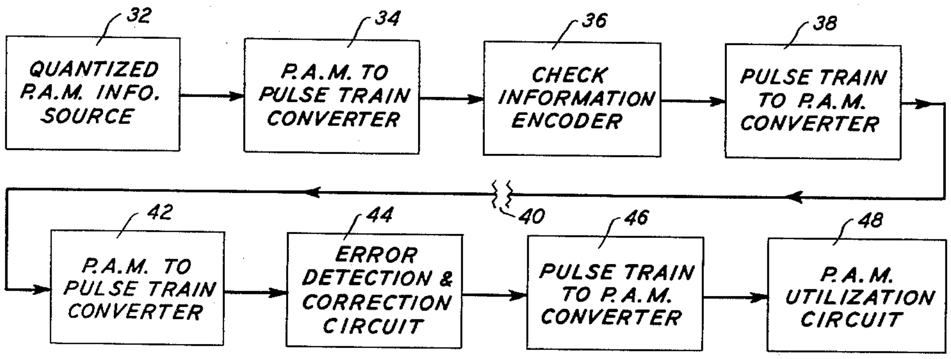
FIG. 2 is a somewhat more detailed block diagram of the system of FIG. 1.

FIG. 2 is a more detailed block circuit diagram indicating an illustrative circuit arrangement which is employed in accordance with the present invention. Specifically, quantized pulse amplitude modulation information is provided by the signal source 32. It is assumed that the pulse amplitude modulation system 26 of FIG. 1 is not perfect, and that there is a certain possibility that the digital signals processed by this system will be mutilated. Accordingly, with reference to FIG. 2, the circuits 34, 36, and 38 are provided to add checking information to groups of the quantized pulse amplitude modulated signals derived from the signal source 32. The check information encoder 36 is designed to operate on digits in the form of trains of pulses. It is to be understood, however, that the function performed on trains of pulses by the encoder 36 could readily be instrumented by circuitry operating directly on the pulse amplitude modulation signals and the instrumentation in the form of a pulse encoder is given merely to provide one operative system. The conversion circuits 34 and 38 are required to transform the pulse amplitude modulation signals to pulse trains which are processed by the check information encoder 36. The break 40 at the output of the conversion circuit 38 indicates an extended transmission signal or another data link, such as a storage unit. The receiver for the system includes the pulse amplitude modulation to pulse train converter 42, the error detection and correction circuit 44, the pulse train to pulse amplitude modulation converter 46 and the pulse amplitude modulation utilization circuit 48.

The circuits of FIGS. 1 and 2 may be instrumented in accordance with a number of specific systems employing codes having different numbers of levels and with various encoding and decoding schemes.

In the following description, various illustrative systems will be considered, and their mode of operation will first be discussed on a logical and mathematical basis, and thereafter with reference to specific illustrative circuits.

The first embodiment which will be considered is a decimal system in which errors of one unit in any one digit place are corrected. The code groups include a total of eight digits. Of the eight digits, six are signal information digits; the seventh has a quinary part which contains signal information, and a binary part containing check information; and the eighth digit is a check digit. This may be represented as follows:

| $D_1, D_2, D_3, D_4, D_5, D_6$ | $D_7$ | $D_8$ |
|---|---|---|
| Signal Information---- | Check and Signal Information | Check Only |

Considering the check information, the seventh digit includes binary check information, and the eighth digit includes both quinary check information and binary check information. The quinary part of the eighth digit is designated $X_1$, the binary part of digit seven is designated $X_2$, and the binary part of digit eight is designated $X_3$. $X_1$ may assume any of five values, 0, 1, 2, 3, or 4, whereas $X_2$ and $X_3$ may each assume only the values 0 or 1.

There are several ways that a decimal digit may be expressed in terms of binary and quinary parts. In the present system, the binary part determines whether the digit is odd or even (corresponding to 1 and 0, respectively), and the quinary part indicates the excess or residue over 0 or 5. Expressed in mathematical terms, the binary and quinary parts *a* and *b*, respectively, of a decimal digit *d* are defined by the following congruence equations:

$$a \equiv d \pmod{2} \quad (1)$$

$$b \equiv d \pmod{5} \quad (2)$$

where *a* is less than the modulus 2 in Equation 1, and *b* is less than the modulus 5 in Equation 2. A table of the correspondence between binary and quinary parts of a decimal digit in accordance with Equations 1 and 2 is shown below.

*Table I*

| Decimal Digit (*d*) | Binary Part (*a*) | Quinary Part (*b*) |
|---|---|---|
| 0 | 0 | 0 |
| 1 | 1 | 1 |
| 2 | 0 | 2 |
| 3 | 1 | 3 |
| 4 | 0 | 4 |
| 5 | 1 | 0 |
| 6 | 0 | 1 |
| 7 | 1 | 2 |
| 8 | 0 | 3 |
| 9 | 1 | 4 |

As explained in number theory texts, Equation 2 for example, indicates the congruence of *b* and *d* modulo 5. More generally, any two numbers are congruent with respect to a given modulus if one of the numbers is equal to the other plus the product of an integer multiplied times the modulus. Relating the concept of congruency to a more familiar subject, it may be noted that two days of a month which are congruent modulo 7 fall on the same day of the week.

Returning to a consideration of the check information, the values of $X_1$, $X_2$, and $X_3$ are determined by computations involving the use of "error characteristics" associated with each digit. In the present example, each digit has three error characteristic digits $E_{ij}$ associated with it. The first subscript "$i$" indicates the number of the code group digit with which the coefficient is associated, and the second subscript "$j$" indicates association with one of the error check symbols $X_1$, $X_2$ or $X_3$, as indicated more clearly in the following table:

*Table II*

| Code Group Digit | Error Characteristic | | |
|---|---|---|---|
| | j=1 | j=2 | j=3 |
| $D_1$ | $E_{11}$ | $E_{12}$ | $E_{13}$ |
| $D_2$ | $E_{21}$ | $E_{22}$ | $E_{23}$ |
| $D_3$ | $E_{31}$ | $E_{32}$ | $E_{33}$ |
| $D_4$ | $E_{41}$ | $E_{42}$ | $E_{43}$ |
| $D_5$ | $E_{51}$ | $E_{52}$ | $E_{53}$ |
| $D_6$ | $E_{61}$ | $E_{62}$ | $E_{63}$ |
| $D_7$ | $E_{71}$ | $E_{72}$ | $E_{73}$ |
| $D_8$ | $E_{81}$ | $E_{82}$ | $E_{83}$ |

Thus, for example, considering the second digit of the error characteristic ($j$=2) associated with the seventh digit of the code group ($i$=7), $E_{ij}$ becomes $E_{72}$.

The actual values of the error characteristic digits employed in the present example are as follows:

*Table III*

| | Error Characteristics | | | Complements of Error Characteristics | | |
|---|---|---|---|---|---|---|
| | $E_{i1}$ | $E_{i2}$ | $E_{i3}$ | $5-E_{i1}$ | $2-E_{i2}$ | $2-E_{i3}$ |
| $D_1$ | 2 | 0 | 0 | 3 | 0 | 0 |
| $D_2$ | 2 | 1 | 1 | 3 | 1 | 1 |
| $D_3$ | 2 | 1 | 0 | 3 | 1 | 0 |
| $D_4$ | 2 | 0 | 1 | 3 | 0 | 1 |
| $D_5$ | 1 | 0 | 0 | 4 | 0 | 0 |
| $D_6$ | 1 | 1 | 1 | 4 | 1 | 1 |
| $D_7$ | 1 | 1 | 0 | 4 | 1 | 0 |
| $D_8$ | 1 | 0 | 1 | 4 | 0 | 1 |

In the error correction system under consideration, the first six decimal digits and the quinary part of the seventh decimal digit are information digits which are supplied to the encoder. The values of the check quantities $X_1$, $X_2$, and $X_3$ are determined systematically in the encoder as a function of the values of the information digits and the error characteristics to permit identification of a particular erroneous digit at the decoder.

In the present system, the value of $X_1$ is chosen so that the sum of the products of each digit $D_1$ through $D_8$ multiplied in each of the columns by the associated error characteristic digit in column $E_{i1}$ of Table III is 0 in the least significant place. Similarly, $X_2$ and $X_3$ are chosen by a similar algorithm employing the error characteristic digits in columns $E_{12}$ and $E_{13}$. This may be expressed mathematically by the following three formulae:

$$D_1E_{11}+D_2E_{21}+D_3E_{31}+D_4E_{41}+D_5E_{51} +D_6E_{61}+D_7E_{71}+D_8E_{81}\equiv 0 \pmod{q_1} \quad (3)$$

$$D_1E_{12}+D_2E_{22}+D_3E_{32}+D_4E_{42}+D_5E_{52} +D_6E_{62}+D_7E_{72}+D_8E_{82}\equiv 0 \pmod{q_2} \quad (4)$$

$$D_1E_{13}+D_2E_{23}+D_3E_{33}+D_4E_{43}+D_5E_{53} +D_6E_{63}+D_7E_{73}+D_8E_{83}\equiv 0 \pmod{q_3} \quad (5)$$

Concerning the meaning of the symbol "0 (mod. $q_j$)," when a quantity is congruent to 0 (mod. $q_j$), that quantity is divisible by $q_j$ with a remainder of 0.

$$2(4)+2(3)+X\equiv 0 \text{ (mod. 5)} \quad (6a)$$
$$8+6+X\equiv 0 \text{ (mod. 5)} \quad (6b)$$
$$X=1 \quad (6c)$$

In the foregoing eqations and elsewhere in the specification (unless otherwise specified), decimal notation is employed.

Concerning the right hand term 0 (mod. $q$) of each of Equations 3, 4, and 5, it may be noted that any arbitrary digit such as Z (mod. $q$) could also be employed, although the equations as shown will normally produce simpler circuits.

The following generalized mathematical expression is equivalent to Equations 3, 4, and 5:

$$\Sigma D_iE_{ij}\equiv 0 \text{ (mod. } q_j) \quad (7)$$

The check digits for a particular code group will now be computed, and the effect of an error of one unit in one of the transmitted signals will be considered. The first seven signal digits will be assumed to be 9 2 7 1 2 1 3. The seventh digit includes only quinary signal information, and will appear in the final message as a "3" or an "8," depending on the value of the binary check symbol $X_2$.

In the process of deriving digits $D_7$ and $D_8$, the material provided in Table III must be utilized as well as the values of digits $D_1$ through $D_6$ as set forth above. These digits are 9 2 7 1 2 1, respectively. In addition, the quinary information conveyed by digit $D_7$ is 3. This may be expressed mathematically as follows:

$$D_7=3 \text{ (mod. 5)} \quad (7a)$$

Now, substituting specific values in Equation 3, the following calculations may be performed:

$$9\cdot 2+2\cdot 2+7\cdot 2+1\cdot 2+2\cdot 1+1\cdot 1+ 3\cdot 1+D_8\cdot 1\equiv 0 \text{ (mod. 5)} \quad (7b)$$
$$44+D_8\equiv 0 \text{ (mod. 5)} \quad (7c)$$
$$4+D_8\equiv 0 \text{ (mod. 5)} \quad (7d)$$
$$D_8\equiv 1 \text{ (mod. 5)} \quad (7e)$$

Proceeding to make similar substitutions in Equation 4, the following calculations result:

$$9\cdot 0+2\cdot 1+7\cdot 1+1\cdot 0+2\cdot 0+1\cdot 1+ D_7\cdot 1+D_8\cdot 0\equiv 0 \text{ (mod. 2)} \quad (7f)$$
$$10+D_7\equiv 0 \text{ (mod. 2)} \quad (7g)$$
$$D_7\equiv 0 \text{ (mod. 2)} \quad (7h)$$

The fact that $D_7$ is congruent to 3 (mod. 5) means that $D_7$ is either 3 or 8. From Equation 7$h$ we know that $D_7$ must be an even number. Accordingly, $D_7$ is equal to 8.

Now, substituting in Equation 5:

$$9\cdot 0+2\cdot 1+7\cdot 0+1\cdot 1+2\cdot 0+1\cdot 1+ 8\cdot 0+D_8\cdot 1\equiv 0 \text{ (mod. 2)} \quad (7j)$$
$$4+D_8\equiv 0 \text{ (mod. 2)} \quad (7j)$$
$$D_8\equiv 0 \text{ (mod. 2)} \quad (7k)$$

From Equation 7$e$ we know that $D_8$ must be equal to either 1 or 6. From Equation 7$k$ it appears that $D_8$ must be an even number. $D_8$ is therefore equal to 6. Accordingly, the code group including check digits which will be transmitted is 9 2 7 1 2 1 8 6.

It will now be assumed that the third digit, a "7," is changed to an "8" in transmission. At the receiver, the three sets of products are summed, as indicated in Equations 3 through 5, and the results noted. If all three sums are zero, the code group has apparently been received correctly. However, the three sums constituting the error characteristic resulting from the increase of the third digit from a "7" to an "8" are 2, 1, and 0. Referring to Table III, this corresponds to the error characteristic of the third digit and indicates that it has been increased by one unit. The correction circuitry in the receiver therefore reduces the third digit by one unit and changes the "8" back to a "7." Similarly, the error correction characteristic associated with the reduction of the third digit by one unit is 310, the "complement" of the error characteristic 210. If the receiver obtains such an error characteristic, therefore, it increases the third digit by one unit.

In the foregoing description, an example of error correction has been given. From a physical standpoint, it may be seen that the correction of one-unit errors in any one digit of the code group is dependent on having different error characteristics for positive or negative errors of one unit. In the present system, the required sixteen different error characteristics are tabulated in Table III. When this requirement is met, the use of the digits of the characteristic as multiplying coefficients in the formulation of the three digits of the error characteristic at the decoder immediately determines the erroneous digit and the sign of the error.

From the foregoing example and discussion, it is clear that a different error characteristic must be employed for each digit of the code group to identify the erroneous digit. Furthermore, the complement of any error characteristic must not be the error characteristic of another digit. This requirement may be fulfilled by making the first digit of a characteristic, which is not zero nor exactly half of the numeration base, less than half of the numeration base employed for the calculation of this digit of the characteristic at the decoder. Thus, in Table III, it may be noted that the first digit of each characteristic is 1 or 2, which is less than half of the numeration base of 5 employed in Equation 3. The corresponding complements therefore have the value 3 or 4, and are clearly distinguishable from the error characteristics.

The circuitry required for instrumenting the error checking system described from a mathematical standpoint in the immediately preceding passages will now be considered. For completeness and in order to simplify the drawings of the encoder and decoder circuits per se, a number of preliminary circuits, or building blocks, will be discussed at this point. Specifically, FIGS. 3 through 11 are directed to component circuits of a specialized type, and the description of circuitry designed to perform the encoding and decoding operation described above starts with FIG. 12.

Figure 3:
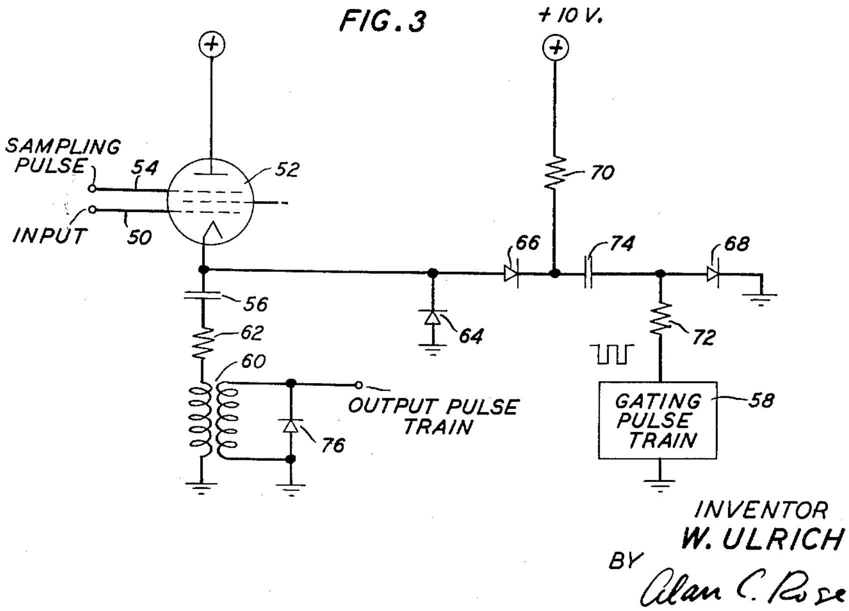
FIG. 3 is a circuit diagram of a converter for changing continuously variable signal information into a pulse train having a number of pulses corresponding to the input level.

FIG. 3 illustrates a suitable pulse amplitude modulation to pulse train converter which may be employed as indicated by the blocks 34 and 42 in FIG. 2. The pulse amplitude input signals are applied to the control grid 50 of the pentode 52. Suitable clock pulses for sampling purposes are applied to the suppressor grid 54 of the pentode. Each time a sampling pulse is applied to the grid 54, the condenser 56 in the cathode circuit of the pentode is charged to a level depending on the input signal at grid 50. The condenser 56 is periodically discharged by a series of nine pulses applied from the pulse train source 58. The primary winding of the transformer 60 is connected in series with the condenser 56 and a relatively small resistor 62 in the cathode circuit of the pentode 52. Each time the condenser 56 is incrementally discharged, a pulse is produced at the output winding of transformer 60.

The discharge circuit for the condenser 56 includes the diodes 64, 66, and 68, the resistors 70 and 72, and the condenser 74. The diode 66 is normally biased in the reverse direction by the positive voltage source connected to the resistor 70. When pulses are applied by the pulse train source 58, the voltage at the terminal of the diode 66 toward the capacitor 74 is reduced to a point near ground potential, and an increment of charge is withdrawn from the condenser 56. After the condenser 56 has discharged to ground potential, current is drawn from ground through diode 64 instead of from the condenser 56. The pulse train source 58 provides nine gating pulses for each sampling pulse applied to lead 54. It is desirable that the pulses supplied by block 58 be at a relatively high amplitude and that resistance 72 be relatively large, so that these two components 58 and 72 together form a source of constant current pulses. If the condenser 56 is charged to its maximum value, each of the nine pulses produces an output pulse at the secondary of transformer 60. If the condenser 56 is charged to a lower level, its charge is reduced to ground after a lesser number of pulses from the pulse train source 58. Accordingly, the number of pulses at the secondary of transformer 60 corresponds to the level of the input signal on lead 50. The diode 76 is provided to short out pulses at the secondary of transformer 60 of the undesired negative polarity.

Figure 4:
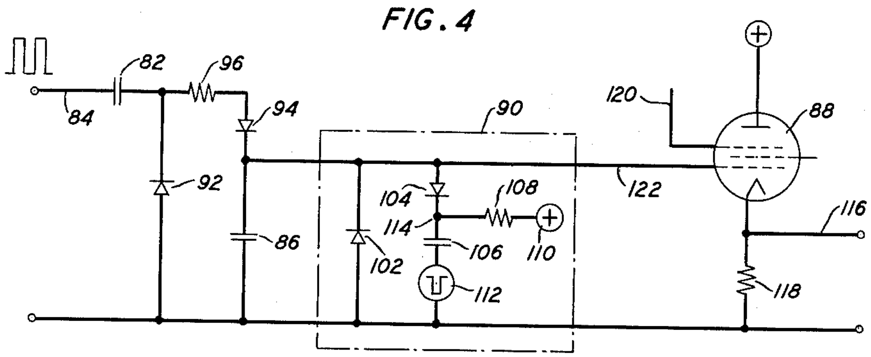
FIG. 4 is a circuit diagram of a converter for transforming a pulse train to a pulse amplitude modulated signal.

FIG. 4 shows one possible method of instrumenting the pulse train to pulse amplitude converters indicated at 38 and 46 of FIG. 2. In FIG. 4, the input pulse train is applied to condenser 82 on lead 84. Each pulse applied on lead 84 supplies an increment of charge to the condenser 86. The input pulses should be relatively short and of considerable amplitude to supply equal increments of charge to condenser 86. The resultant potential on condenser 86 is periodically sampled by pentode 88, and the condenser 86 is then discharged by the switching network included in the dashed line box 90.

The circuit for charging the condenser 86 includes the two diodes 92 and 94 and the resistor 96. When a positive pulse is applied to lead 84, current flows through diode 94 and charges condenser 86. The rate of current flow is determined by the magnitude of the pulses applied to lead 84 and the size of the resistor 96. Between input pulses, the potential on the side of condenser 82 coupled to resistor 96 is restored to ground by the path through the diode 92.

The circuit 90, which is employed to discharge the condenser 86, includes the two diodes 102 and 104, the condenser 106, and the resistor 108. The diode 102 is provided to prevent the output terminal of condenser 86 from reaching a potential which is less than ground potential. The positive voltage applied to the resistor 108 at terminal 110 is greater than the maximum potential which normally is applied to condenser 86. The diode 104 is therefore normally in the blocked state. However, when a negative pulse is applied by the pulse source 112, the point 114 between the diode 104 and the condenser 106 tends toward a negative potential, and the charge on capacitor 86 is reduced to the ground potential limit provided by the diode 102.

As mentioned above, the pentode 88 is a sampling tube which produces quantized pulse amplitude modulated output signals. The pentode 88 is arranged as a cathode follower amplification stage with the output signal being taken on lead 116 as developed across the cathode follower resistance 118. Sampling pulses are applied to the suppressor grid 120 of the pentode 88. The output from the storage condenser 86 is coupled to the control grid of the pentode 88 on lead 122. The sampling pulses applied to the grid 120 are carefully timed to occur after the last pulse of a digit series applied to input lead 84 and immediately prior to the occurrence of a discharge pulse from the source 112.

Throughout the discussion of the present circuitry, numerous control pulses which are accurately timed with respect to other control pulses are required. Techniques for obtaining such control pulses are well known in the art. One practical technique which may be employed, however, involves the use of two or more ring counters operating at different rates. Thus, for example, a slow ring counter may be advanced by one position each time a fast ring counter is stepped around a complete cycle of operation. By connecting a coincidence or "AND" gate to any pair of leads of the fast and slow counters, respectively, a pulse may be obtained at any desired time slot included in a complete cycle of operation of the fast and slow ring counters. When the fast ring counter is energized from a suitable source of clock pulses, an accurate timing system is obtained with output pulses available in any one or in any group of time slots as desired.

In the following description of the complete checking circuits which are shown in block diagram form in FIG.

2, a number of component circuits will be employed many times. The nature of the simplest logic circuits, such as "AND," or coincidence circuits, and "OR" circuits for buffering purposes, will not be reviewed here. Typical circuits of this type are disclosed in texts such as "The Design of Switching Circuits" by William Keister et al., D. Van Nostrand Company, Inc., New York, 1951. The next few figures of the drawings are designed to indicate the details of circuitry of somewhat greater complexity which will be employed in later figures of the drawings.

Figures 5A, 5B:
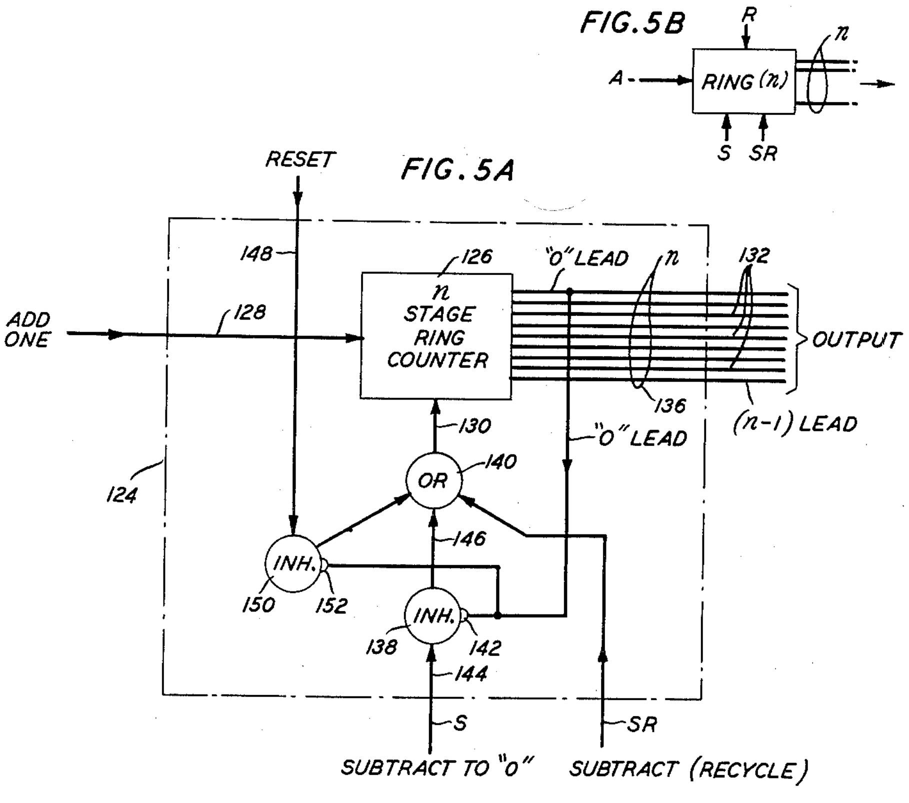
FIG. 5A represents a ring counter and its associated control leads.
FIG. 5B is the symbol which will be employed to represent the circuit of FIG. 5A.

FIGS. 5A and 5B show a ring counter circuit and its symbol which will be employed in the balance of the drawings. The basic circuit included in the dash-dot box 124 of FIG. 5A is a conventional ring counter 126. The ring counter 126 has an add input lead 128 and a subtract input lead 130. Although many add-subtract ring counters are well known in the art, one suitable ring counter is described on pages 105 and 106 of a text entitled "Automatic Digital Computers," by A. D. Booth and K. H. V. Booth, London, Butterworth Scientific Publications, 1956. An output lead is associated with each stage of the ring counter 126. These leads are indicated by the parallel lines 132 and the loop 136. A letter *n* which is associated with the circle 136 indicates the number of leads at the output of the counter 126. Only one output lead from the ring counter 126 is energized at one time. When a pulse is applied to the add input lead 128, the state of the ring counter is shifted by one to the next higher state; similarly, when a pulse is applied to the subtract lead 130, the state of the ring counter is shifted by one unit in the negative direction.

It is occasionally desirable to apply input signals to a ring counter circuit to perform a subtraction function which stops at the stage of the ring counter representing zero. In FIG. 5A this function is accomplished by the inhibit circuit 138 and the OR circuit 140. The "0" lead from the ring counter is connected to the inhibit terminal 142 of the inhibit unit 138. The desired "subtract-to-0" input is connected to the normal input lead 144 to the inhibit unit 138. The output lead 146 from the inhibit unit 138 is connected to one input of the OR unit 140. The output from the OR unit 140 is connected to the subtract input lead 130 of the ring counter 126. Thus, pulses on the lead 144 are transmitted through the inhibit unit 138 to the OR unit 140 so long as the ring counter is in a state other than the "0" state. When the ring counter reaches the "0" state, however, the energization of the inhibit terminal 142 of the inhibit unit 138 precludes the energization of lead 146, and no pulses are applied to the subtract input lead 130 of the ring counter 126.

The reset-to-zero input lead 148 is connected to the normal input of the inhibit unit 150. The zero lead from the ring counter 126 is connected to the inhibit terminal 152 of the inhibit unit 150. A series of nine pulses is always applied to the reset lead 148. When the nine pulses are applied on lead 148, the action is identical with that effective when pulses are applied to lead 144 as considered above. Accordingly, the ring counter is stepped backward to zero. Assuming that the counter is a ten-stage counter, nine pulses are always sufficient to step it to the "0" state. When counters having a number of states other than ten are employed the number of reset pulses which are applied is one less than the number of stages of the counter. In the circuit of FIG. 5A, therefore, the basis for the symbol shown in FIG. 5B has been established. The significance of the add, the reset, and the two subtract leads has also been developed. In this regard it is particularly to be noted that the add input is always connected to the left hand side of the block representing the ring counter, the reset lead to the top, and the subtract input leads to the bottom. It may also be noted that the subtract lead designated "S" is employed to subtract to "0," while the lead designated "SR" indicates that the subtract operation recycles the ring counter past the "0" stage. Unless otherwise designated, in the subsequent drawings a lead entering the bottom of a ring counter is a subtract to "0" lead.

Figure 6A:
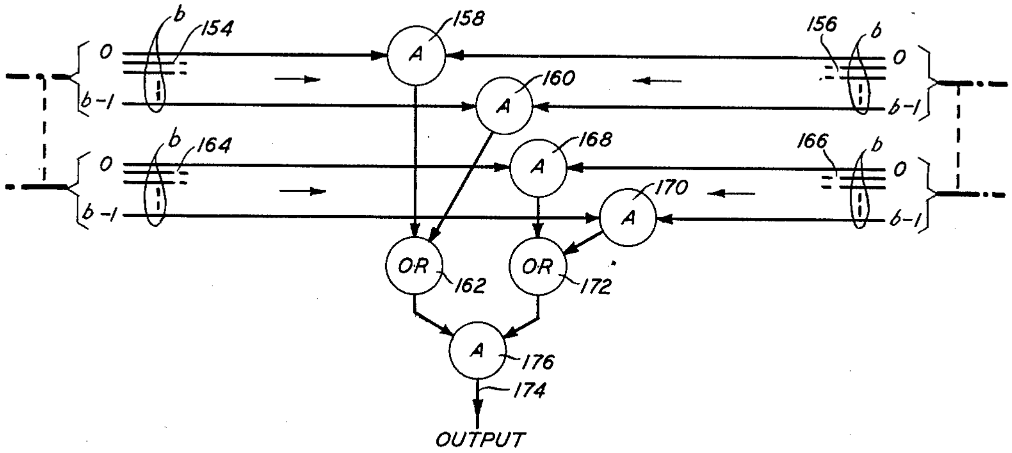
FIGS. 6A and 6B represent the circuitry of a matching circuit and the symbol employed to represent the matching circuit, respectively.
Figure 6B:
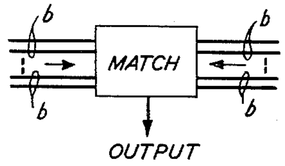

FIGS. 6A and 6B illustrate a logic circuit diagram of a matching circuit and the symbol for a match circuit, respectively. In FIG. 6A, a first group of leads 154 is shown matched against a second group of leads 156. In the case of each of the groups of leads 154 and 156, only one lead in each group is energized. The leads designated 154 or 156 may therefore be the output leads from a ring counter. The corresponding leads in the two groups are connected to AND units. Thus, for example, the "0" leads from the groups 154 and 156 are connected to the AND unit 158. Similarly, the *b*–1 lead from group 154 and the *b*–1 lead from group 156 are both connected to the AND unit 160. Similarly, all the other corresponding leads from the two groups of leads are connected to other AND units (not shown). The output leads from all the AND units including AND units 158 and 160 are connected to an OR unit 162. The outputs from two other ring counters are designated by the reference numbers 164 and 166. The signals on the corresponding leads of these two groups of leads are compared in AND units including the AND units 168 and 170. The output leads from the AND units including AND units 168 and 170 are combined in the OR circuit 172. In order to obtain an output signal on the output lead 174 from the entire match circuit shown in FIG. 6A, a complete match of each group of leads must be obtained. Accordingly, the output lead from the OR units 162 and 172 are connected to the AND unit 176. The AND unit 176 produces an output only when a complete match of the input signals is found. The symbol for the circuit shown in detail in FIG. 6A appears in FIG. 6B.

Figure 7B:
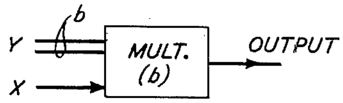
FIGS. 7A and 7B show the circuit diagram and symbol, respectively, for a multiplication circuit.
Figure 7A:
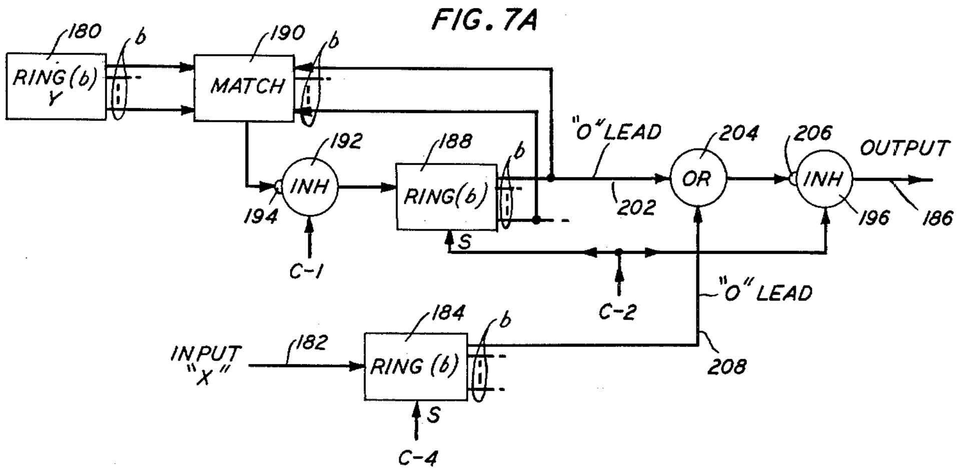

The circuit of FIG. 7A is a multiplier of a specialized type which is particularly adapted for use as a component in one of the illustrative encoding schemes which will be described hereinafter. In FIG. 7A, a first number is stored in the ring counter 180 and a second number is applied in pulse form to input lead 182. The number applied in pulse form on lead 182 is stored in the ring counter 184. Although the counters are designated as having "*b*" stages, for the purposes of describing FIG. 9A it will be assumed that the counters have ten stages. The output from the multiplier appears on lead 186. The output on lead 186 will be a series of pulses, with the total number of pulses being equal to the product of the number stored in the ring counter 180 multiplied by the number stored in the ring counter 184. Thus, for example, if the ring counter 180 has the number "4" stored in it and the ring counter 184 is in the state representing the number "6," six pulse trains each having a series of four pulses will appear on output lead 186, thus making up a total of twenty-four pulses.

Figure 8:
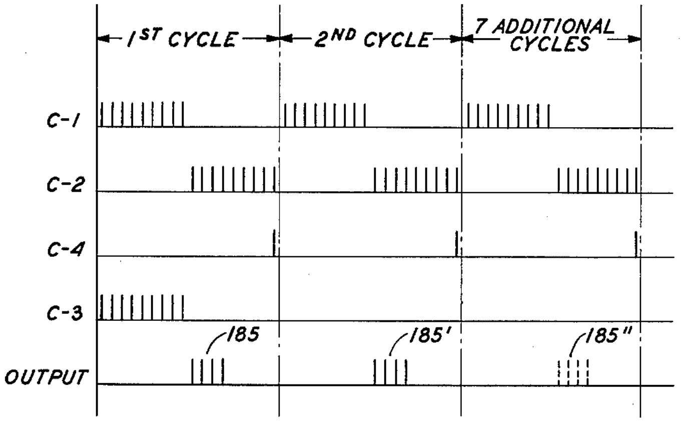
FIG. 8 is a diagram of pulse trains which appear at various points in the multiplication circuit of FIG. 7A.

The circuit of FIG. 7A requires a number of control pulses. FIG. 8 shows the timing of the control pulses which are applied as indicated by letter designations in the circuit of FIG. 7A. As mentioned above, the control pulses shown in FIG. 8 may be produced by two or more ring counters, or in accordance with other techniques for producing clock and programming pulses which are well known in the digital computer art.

The first step in the multiplication process is to enter the number in ring counter 180 into ring counter 188 without changing the numerical representation in the ring counter 180. This is accomplished by the matching circuit 190 and the inhibit unit 192. The output from the inhibit unit 192 is connected to the "add" input of the ring counter 188. A series of nine pulses is then applied on the normal input lead C–1 to the inhibit unit 192. In general, with a *b* stage ring counter *b*–1 pulses would be used in the C–1 train, as well as in the C–2 and C–3 trains which appear in FIG. 8. The timing of the pulses applied to lead C–1 is indicated in the first row of pulses of FIG. 8. The output from the ring counter 188 is matched with the output from the ring counter 180 in the matching circuit 190. The output from the match circuit 190 is coupled to the inhibiting input terminal of the inhibit unit 192. When the ring counter 188 is set to the same state registered by the ring counter 180, an output signal is applied to the inhibiting terminal 194 of inhibit unit 192, and no more pulses are transmitted from the input lead to the "add" input of the ring counter 188.

Now that the ring counter 188 is set to the same state registered by ring counter 180, the information stored in ring counter 188 is read out in terms of a pulse train. This is accomplished by applying pulses on the lead C–2 to the subtract input to the ring counter 188 and to the normal input of the inhibit unit 196. The output lead 202 from the "0" state of the ring counter 188 is coupled through the OR unit 204 to the inhibiting input terminal 206 of the inhibit unit 196. Accordingly, when the ring counter 188 is set back to the "0" state, pulses from the lead C–2 applied to the normal input to the inhibit unit 196 are blocked from the output lead 186. It may be noted from FIG. 8 that the pulse train C–1 is a series of nine pulses, and that the pulse train C–2 is another series of nine pulses which occurs in the digit periods following the occurrence of the pulse train designated C–1. Accordingly, the ring counter 188 is successively stepped up to the state registered in ring counter 180, and is then stepped back to 0 with a pulse appearing on output lead 186 corresponding to each pulse required to step the counter 188 back to 0.

Following each sequence of C–1 and C–2 pulses, a single pulse designated C–4 in FIG. 8 is applied to the subtract input lead C–4 of the ring counter 184. The lead 208 is connected from the "0" state of the ring counter 184 to the OR unit 204. When the ring counter 184 is finally set back to the "0" state, therefore, the inhibiting input terminal 206 of the inhibit unit 196 is energized, and no additional pulses appear on output lead 186. This operation blocks the series of output pulses from ring counter 188 after a number of repetitions equal to the number originally set in the ring counter 184. Accordingly, the desired number of pulses equal to the product of the numbers set in ring counters 180 and 184 is produced at output lead 186. The output pulses are indicated at 185 in FIG. 8. The pulse train 185'' is shown in dashed lines, as the group of four pulses is only repeated six times. FIG. 7B is the block which will be employed to represent the circuit of FIG. 7A in subsequent figures of the drawings.

Figure 9A:
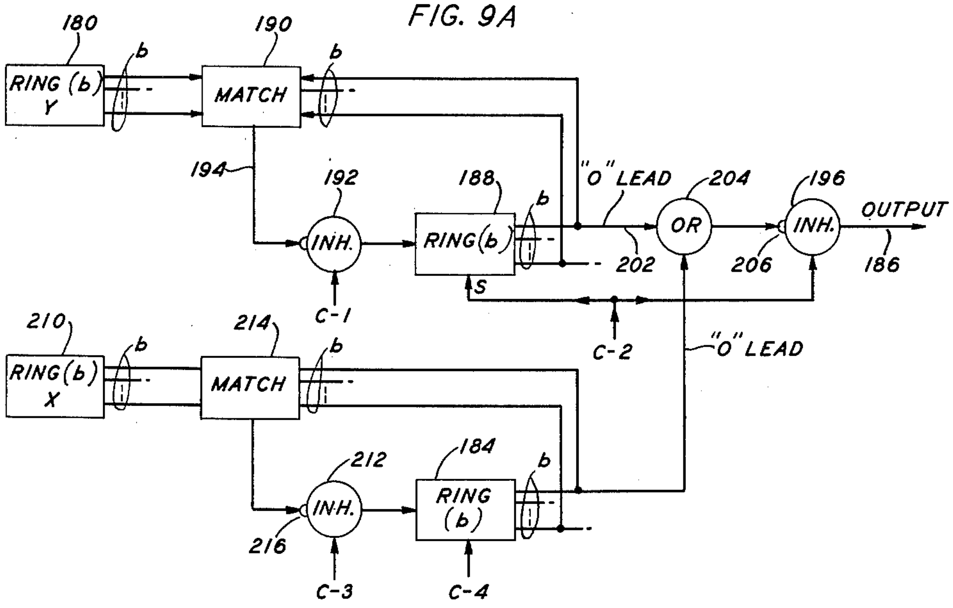
FIGS. 9A and 9B represent the circuit and symbol, respectively, for another multiplication circuit.
Figure 9B:
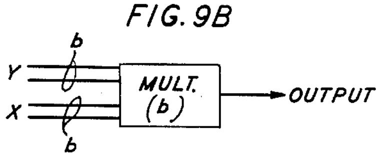

The multiplier of FIG. 9A is generally similar to the multiplier of FIG. 7A. However, in FIG. 9A the input X is initially in the form of the state of the ring counter 210, rather than a series of pulses as in FIG. 7A. Accordingly, a single train of nine pulses designated C–3 in FIG. 8, are applied to the input lead C–3 to the inhibit unit 212 in FIG. 9A. When the ring counter 184 is set to the state registered in the ring counter 210, an output signal from the match circuit 214 energizes the inhibit terminal 216 of the inhibit unit 212, and further pulses applied to input lead C–3 are blocked from the ring counter 184. Unlike the pulse trains designated C–1, C–2 and C–4 in FIG. 8, the pulse train C–3 occurs only once during each complete multiplication cycle. The operation of the circuit of FIG. 9A follows that of FIG. 7A exactly, once the number "X" is transferred from ring counter 210 to the ring counter 184. The symbol shown in FIG. 9B will be employed in subsequent drawings to represent the multiplier circuit shown in FIG. 9A.

The circuit of FIG. 10A is a shift register for storing and shifting multidigit code groups. Assuming that the shift register must store N digits, it should include 2N ring counters. Three representative ring counters 220, 222 and 224 are indicated in FIG. 10A. In the transfer of signals from the ring counter 220 to the ring counter 222, it will initially be assumed that the ring counter 222 is in the "0" state, and that the ring counter 220 is set to a state representing a predetermined digit. The first step in transferring the number in ring counter 220 to ring counter 222 is the application of nine pulses to input lead C–5. This action is represented diagrammatically in FIG. 10B by the pulses designated C–5. The transfer of information out of the ring counter 220 to the output lead 226 from the inhibit unit 228 is substantially the same as that described above in connection with the operation of the multiplier circuit of FIG. 7A. More specifically, the nine pulses designated C–5 are applied to the subtract-to-"0" input lead to the ring counter 220 and to the normal input terminal of the inhibit unit 228. The output lead from the "0" state of the ring counter 220 is connected to the inhibiting input terminal 230 of the inhibit unit 228. Each C–5 pulse steps the ring counter 220 one step toward the "0" state. When it reaches the "0" state, the inhibiting input terminal 230 of the inhibit unit 228 is energized. This blocks the transmission of additional pulses applied to the normal input to the inhibit unit 228. Accordingly, the number of pulses applied to ring counter 222 is equal to the number of steps required to reset ring counter 220 to the "0" state.

Following the entry of information into the ring counter 222, from the ring counter 220, an additional group of nine pulses designated C–6 in FIG. 10B is applied to lead C–6 associated with ring counter 222 and to the inhibit unit 232 at the output of ring counter 222. The application of a train of C–6 pulses steps the ring counter 222 back to 0, and transmits a corresponding number of pulses to the next ring counter in the shift register. As indicated by the next subsequent sequence of C–5 and C–6 pulses in FIG. 10B, this process can be continued as desired after suitable intervals have elapsed for other digital functions which must be accomplished. The symbol shown in FIG. 10C will represent the shift register circuit shown in FIG. 10A.

The circuit of FIG. 11A is an error characteristic generator. It is designed to generate the error characteristic digits indicated in Table III which are employed in the calculation of the check quantities $X_1$, $X_2$, and $X_3$. The characteristic generator of FIG. 11A is essentially a three-stage counter including the three bistable circuits, or flip-flops, 236, 238, and 240. Considering the circuit of FIG. 11A as a counter for the moment, the most significant digit is developed by the flip-flop 236, the next most significant digit by the flip-flop 238, and the least significant digit by the bistable circuit 240. The states of the first, second, and third stages of the counter are indicated in the table of FIG. 11B. To conform to the requirements indicated in Table III, however, one state of the first bistable circuit is designated "2" and the other state of this circuit is designated "1." If the designations normally employed in binary counters were used, the state designated "2" would be designated as the "0" state.

The control circuitry for the three-stage counter of FIG. 11A includes the error characteristic advance input pulse leads 242, 244, and 246, which are pulsed simultaneously. The AND circuits 248 and 250 are employed to control the change of state of the flip-flops 238 and 236 respectively. The two inputs to the AND unit 248 are the characteristic advance input lead 244 and the "0" output lead of the bistable circuit 240. Accordingly, the second state of the characteristic generator changes state only when the third stage has been in the "0" state and is being advanced to the "1" state. The AND unit 250 at the input to the bistable circuit 236 has three inputs. These three inputs are the channel advance input lead 242, a lead from the "1" output of the bistable circuit 240, and a lead from the "0" output of the circuit 238. The flip-flop 236 therefore changes state only when the second stage of the ring counter has been in the "0" state and the third stage has been in the "1" state, and upon the occurrence of a channel advance pulse. This mode of operation is tabulated in FIG. 11B.

Figure 12:
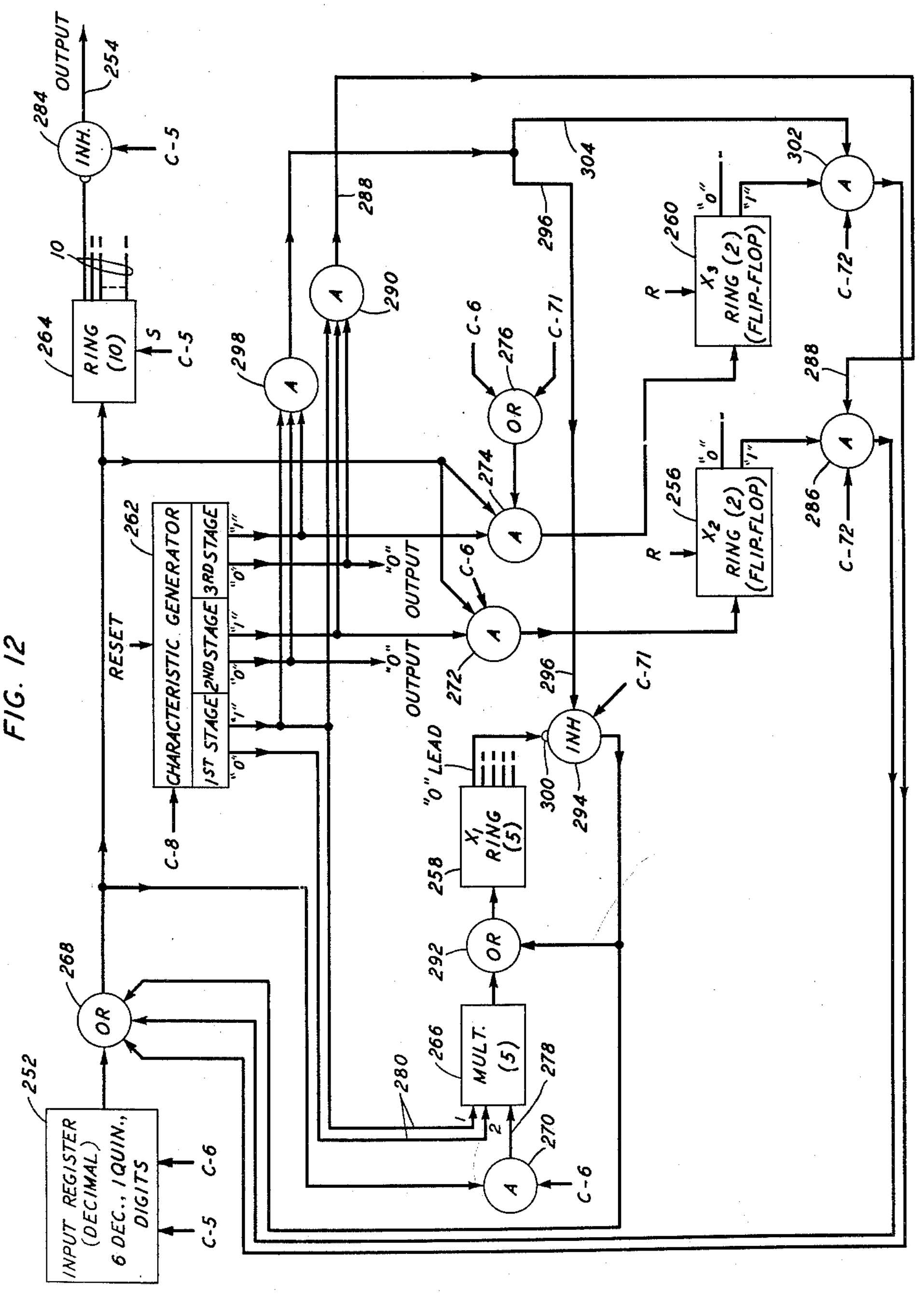
FIG. 12 is an encoder in accordance with the invention for digital systems in which errors of one unit in level may be detected.

The circuit of FIG. 12 is an encoder which may be employed as the circuit block indicated at 36 in the circuit of FIG. 2. It develops the three check quantities $X_1$, $X_2$, and $X_3$ in accordance with the mathematical operations indicated in Equations 3, 4 and 5. Following the development of these check quantities, corresponding check information is added to the input code group.

The circuit of FIG. 12 will first be considered briefly from an operational standpoint to give direction to the detailed description which follows. As set forth in the earlier discussion, the original input code group includes six decimal digits and one quinary digit. In the circuit of FIG. 12, these signals are initially stored in the input register 252. The six decimal digits ultimately reach the output lead 254 from the circuit of FIG. 12 unchanged. The quinary digit reaches the output lead 254 either entirely unchanged or changed by the addition of five pulses (which leaves the quinary information unchanged), in accordance with the value of the check quantity $X_2$. The value of the check quantity $X_2$ is determined by the state of the bistable circuit 256 in which the arithmetic operations indicated by Equation 4 are performed. The eighth digit which appears at the output lead 254 is developed from the quinary check quantity $X_1$ and the binary check quantity $X_3$. The two check quantities $X_1$ and $X_3$ are determined by the states of the ring counter 258 and the bistable circuit 260, which perform the arithmetic operations conforming generally to those indicated in Equations 3 and 5, respectively.

In a consideration of the circuit of FIG. 12, the nature of the control pulses applied at various points of the circuit is essential to a full understanding of its operation. The sequence of the control pulses is set forth in FIG. 13. Considering the initial state of the circuit of FIG. 12, the characteristic generator 262 is initially set to "0," as indicated by the first row of the table of FIG. 11B. The ring counters 258 and 264 and the multiplier 266 are also cleared, and the flip-flops 256 and 260 are set to the "0" state. Now, referring to FIG. 13, a series of of nine C–6 pulses are applied to the input register 252. The first decimal digit is transmitted from the input register 252 through the OR unit 268 to the ring counter 264. Pulses are also applied from the output of the OR unit 268 to the AND units 270, 272 and 274. Trains of C-6 pulses are also applied to the AND unit 270, the AND unit 272, and to the AND unit 274 (through the OR unit 276) to gate the first decimal digit through the AND units. The multiplier 266 therefore has the first decimal digit applied to one input circuit 278 and the output from the first stage of the characteristic generator applied to the other input 280. The output of the multiplier 266 therefore constitutes the product of these two numbers, which is the first term $E_{11}D_1$ of Equation 3. This product is stored in the ring counter 258. It may be noted that the ring counter 258 has only five stages. Accordingly, the final sum stored in the ring counter 258 will be a sum computed on the numeration base 5 with more significant digits being ignored. Referring to Equation 3, this type of sum is required by the indication "mod. 5" which appears at the right-hand side of the equation symbol. The bistable circuits 256 and 260 form the sums mod. 2 indicated by Equations 4 and 5 in a manner similar to the operation of the ring counter 258. In this regard, the AND gates 272 and 274 control the application of signals to the flip-flops 256 and 260, under the control of concurrent signals from the respective characteristic generator stages, the input OR gate 268, and the control leads C–6.

More specifically, the bistable circuits 256 and 260 form the sums mod. 2 indicated by Equations 4 and 5 in the following manner. Each of $E_{12}$ and $E_{13}$ is, according to the first row of FIG. 11B, equal to "0." This means that each of the "1" output leads of the second and third stages of the characteristic generator 262 is initially not energized. Therefore, the output of the OR gate 268 is not gated through either the AND gate 272 to the bistable circuit 256 or through the AND gate 274 to the bistable circuit 260. In other words, $D_1E_{12}$, the first term of Equation 4, or $D_10$, is gated to the bistable circuit 256, and $D_1E_{13}$, the first term of Equation 5, or $D_10$, is gated to the bistable circuit 260. Accordingly, the circuits 256 and 260, which as indicated above were initially set to their "0" states, remain set at "0."

Then, in its proper time sequence, as described hereinbelow, a characteristic advance pulse causes the representations of the first, second, and third stages of the characteristic generator 262 to become "2," "1," and "1," respectively, as indicated in the second row of FIG. 11B, and to remain at those values until the occurrence of a subsequent characteristic advance pulse. Accordingly, the $D_2$ output of the OR gate 268 is gated through each of the AND circuits 272 and 274 to the bistable circuits 256 and 260, respectively. In other words, $D_2E_{22}$, the second term of Equation 4, or $D_21$, is gated to the bistable circuit 256, and $D_2E_{23}$, the second term of Equation 5, or $D_21$, is gated to the bistable circuit 260. The other terms of Equations 4 and 5 are formed in a similar and equally straight-forward manner.

It is noted that each of circuits 256 and 260 includes only two stages. Accordingly, the final sum stored in each of the circuits 256 and 260 will be a sum computed in the numeration base "2" with more significant digits than the least significant one being ignored.

Figure 13:
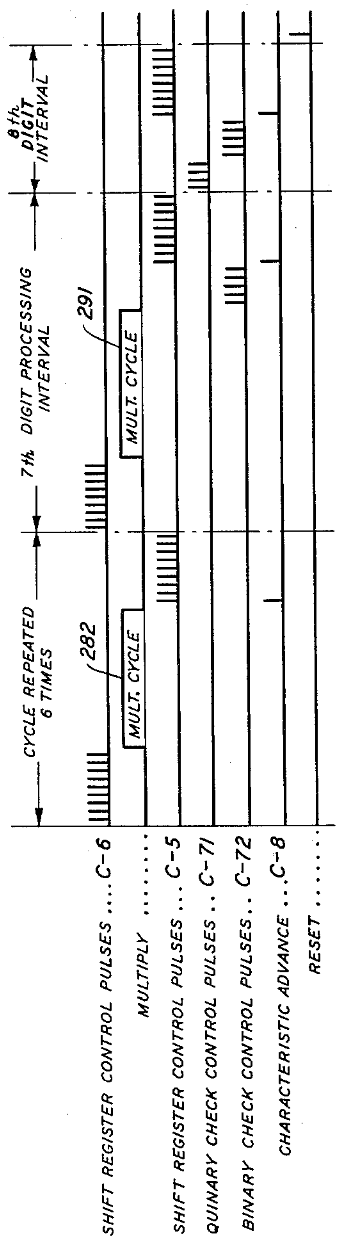
FIG. 13 is a diagram indicating the pulse trains which appear at various points in the circuit of FIG. 12.

Following the multiplication operation indicated by the block of pulses designated 282 in FIG. 13, a series of nine C–5 pulses occur. The nature of the train of multiplication pulses indicated at 282 in FIG. 13 is shown in detail in FIG. 8. The C–5 pulses are applied to the input register 252, the ring counter 264, and the inhibit unit 284 in a manner described in connection with the detailed description of the shift register of FIG. 10A. The foregoing operation produces a train of pulses on output lead 254 corresponding to the first decimal digit. Concurrently with the occurrence of one of the C–5 pulses, an error characteristic advantage pulse C–8 is applied to the characteristic generator 262. This steps the characteristic generator to the next successive state indicated in FIG. 11B. The second train of C–6 pulses is then applied to the input register 252, and the entire sequence of operations described above is repeated. Following six such repetitions of the C–6, the C–5, the multiply group of pulses, and the characteristic advance pulse C–8, the ring counter 258 and the two flip-flops 256 and 260 are set to states required by the products of the appropriate error characteristic terms as multiplied by the first six decimal digits.

The seventh digit is a quinary information digit, and therefore can include up to four pulses. For convenience, however, the group of C–6 pulses associated with the processing of the seventh digit is the same group of nine pulses which has been employed for the normal decimal digits one through six. The first step in the development of the seventh decimal digit is the gating of the quinary digit from the last stage of the input register 252 to the ring counter 264. Now, if the sum developed by the flip-flop 256 is an even number, the seventh digit remains unchanged. If the flip-flop 256 is in the "1" state, however, indicating an odd sum, an additional five pulses must be added to the seventh digit which is stored in the ring counter 264. This is accomplished by the AND unit 286, a train of five clock pulses C–72, and the input lead 288 which is coupled through a simple logic circuit to the characteristic generator 262. The lead 288 is connected to the output of the AND unit 290. It is necessary that the output from the AND unit 286 be energized only during the processing of the seventh digit. During the processing of the seventh digit, the characteristic generator is in the "110" state. By connecting the AND unit 290 to the "1" output lead of the first stage of the characteristic generator, to the "1" output lead of the second stage, and to the "0" output lead of the third stage of the characteristic generator, lead 288 is energized only during the processing of the seventh digit. Immediately following the series of multiplication pulses designated 291 in FIG. 13 which are associated with the seventh digit processing period, a series of five C–72 pulses are provided. If the flip-flop 256 is set to the "1" state, these five pulses are gated through the OR unit 268 to increase the decimal digit stored in the ring counter 264 by five units. This completes the entry of the first binary check digit $X_2$ into the code group. Accordingly, a series of nine C–5 pulses is provided at this point to gate the seventh digit to the output lead 254.

The formulation of the eighth digit will now be considered. As may be recalled by reference to Equation 3, the quinary part of the eighth digit is the number which causes the sum indicated in Equation 3 to be equal to 0 mod. 5 when it is multiplied by the characteristic term $E_{81}$. As indicated by the final row in Table III and in the final row of FIG. 11B, the characteristic term $E_{81}$ is equal to 1. The quinary quantity $X_1$ will therefore be the number which, when added to the first seven terms of Equation 3, will make the complete sum equal to 0 mod. 5. The sum of the first seven terms mod. 5 has now been entered in the ring counter 258. A group of pulses up to four in number will now be applied to the OR unit 268 and to the OR unit 292. The circuit is arranged so that as soon as the ring counter 258 is advanced to the "0" state, further pulses are blocked.

Referring to FIG. 13, the four quinary check control pulses C–71 occur at the beginning of the time period directed to the formation of the eighth decimal digit. The C–71 pulses are connected to a normal input of the inhibit unit 294. To insure the energization of the output lead from the inhibit unit 294 only during the eighth digit formation interval, the input 296 derived from the characteristic generator is provided. The characteristic which is uniquely associated with the eighth digit formation period is "101," as indicated in the last row of FIG. 11B. The AND unit 298 which energizes lead 296 therefore has as inputs the "1" output lead of the first stage, the "0" output lead of the second stage, and the "1" output lead of the third stage of the characteristic generator.

The ring counter 258 controls the transmission of C–71 pulses through the inhibit unit 294 by a connection from the "0" output state of the ring counter to the inhibit input terminal 300 of the inhibit unit 294. Thus, if the ring counter 258 is already in the "0" state, the required quinary check digit is "0" and no C–71 pulses are transmitted through the inhibit unit 294 to be registered in the ring counter 264 as the first part of the eighth digit. However, assuming for example that the ring counter 258 is in the "3" state, then the first two pulses of the four C–71 pulses are passed through the inhibit unit 294 and the OR unit 268 and are registered in the ring counter 264. These two pulses are coupled to the ring counter 258 through the OR unit 292 and set the ring counter to the "0" state. The inhibit input 300 of the inhibit unit 294 is therefore energized, and additional pulses of the C–71 train are blocked.

The binary portion of the eighth digit is formed in a manner which is analogous to the formation of the binary portion of the seventh digit. In the formation of this final portion of the eighth digit, the flip-flop 260 and the AND unit 302 perform the same functions described above for the flip-flop 256 and the AND unit 286, respectively. The C–72 train of pulses which occurs during the eighth digit formation period is coupled to the AND unit 302. The lead 304 is coupled from the output of the AND unit 298 to insure transmission of pulses through the AND unit 302 only during the eighth digit formation period. The third input to the AND unit 302 is coupled to the "1" output of the flip-flop 260. Accordingly, if the sum registered in the flip-flop 260 is odd, an additional group of five pulses is added to the quinary digit registered in the ring counter 264. A final train of C–5 pulses is applied to the circuits 252, 264, and 284 to gate the eighth digit out of the ring counter 264 and to complete the encoding process performed by the circuit of FIG. 12.

Figure 14:
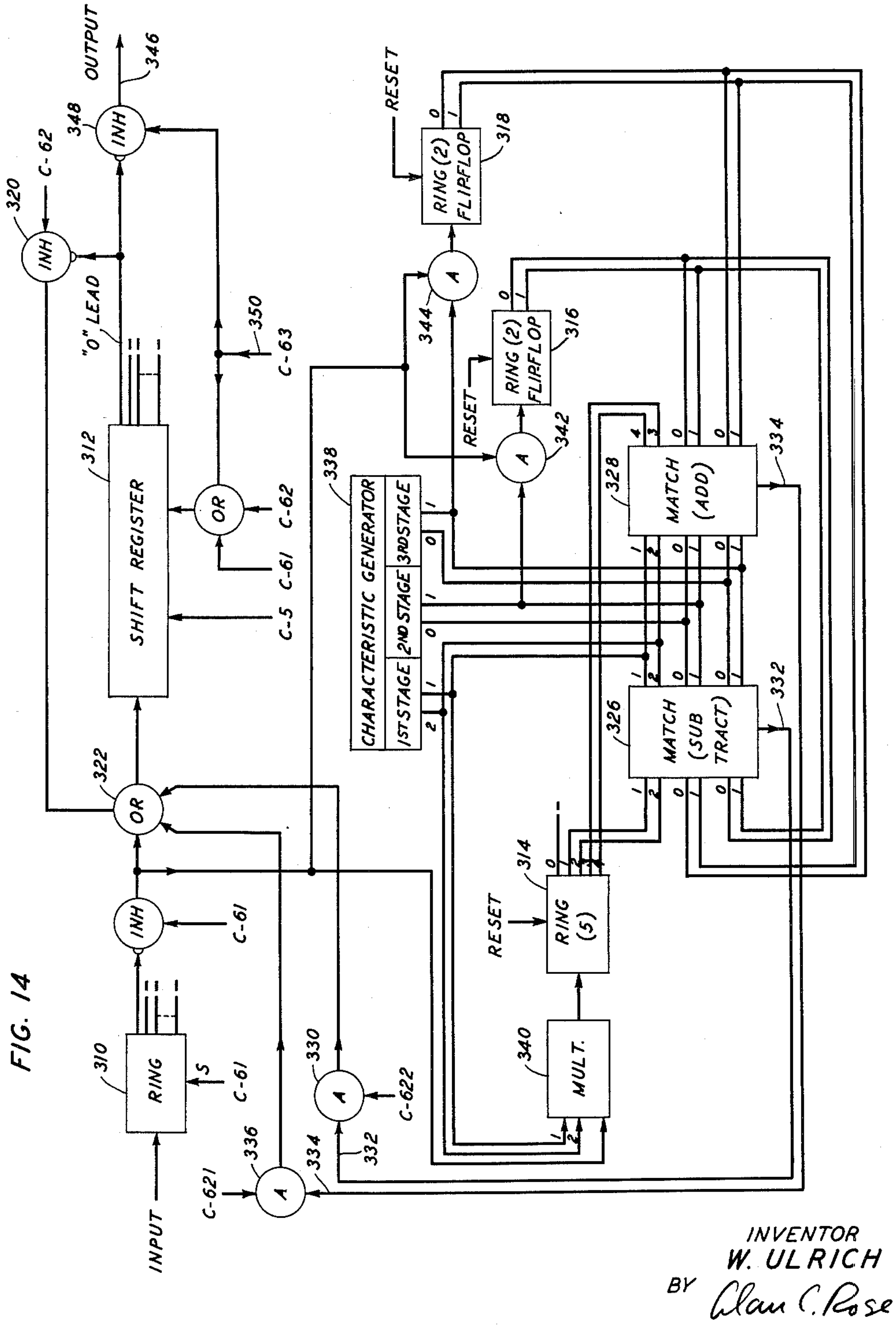
FIG. 14 is a decoder and error correction circuit which is the companion circuit of the encoder of FIG. 12.

The circuit of FIG. 14 is an error detection and correction circuit which corresponds to block 44 of FIG. 2. In the circuit of FIG. 14, eight decimal digits are applied successively to the ring counter 310. The eight decimal digits are transferred to the shift register 312. In the course of transmission to the shift register 312, the eight decimal digits are processed as indicated in Equations 3, 4, and 5, and the results are registered in the ring counter 314, the flip-flop 316, and another flip-flop 318. In the case of a single error in any one of the eight decimal digits, the error characteristic registered by the three circuits 314, 316, and 318 will correspond to one of the sixteen error characteristics shown in Table III. The error characteristic registered in circuits 314, 316, and 318 therefore uniquely determines which digit is in error and whether the one unit error is positive or negative. As mentioned above, the error characteristic itself will be produced if the error is an increase of one unit in the level of a given digit; whereas the complement of the error characteristic is produced when the error is a reduction in level by one unit of a given digit.

To identify and appropriately correct the erroneous digit, the eight digits in the shift register are recirculated through the path including the inhibit unit 320 and the OR unit 322 concurrently with the recycling of the characteristic generator 338. The matching circuits 326 and 328 compare the error characteristics and the complements of the error characteristics, respectively, with the numbers registered in the ring counter 314 and the flip-flops 316 and 318. The circuit 326 is arranged to indicate a direct match by the direct connections from the circuits 314, 316 and 318 to the match input leads. The matching circuit 328 is arranged to produce output signals upon the occurrence of a complement match through the matching of the leads representing the "4" and the "3" states of the ring counter 314, with the "1" and the "2" output leads, respectively, of the first stage of the characteristic generator. When a match is produced in the circuit 326, an output pulse is applied to the AND unit 330 on lead 332. This output signal indicates that the digit which has just been transferred from the output of the shift register 312 through the circuits 320 and 322 to the input of the shift register 312 is in error, and that it is in fact one unit greater than its original value. It is reduced one unit in level by the application of nine additional pulses designated C–622 which are applied to the shift register through the AND unit 330 and the OR unit 322. The nine additional pulses advance the first stage of the shift register 312 through 0 and back to a value which is one unit less than the erroneous value previously registered in the first stage of the shift register 312.

An output pulse from the match circuit 328 indicates that the digit which has just been recirculated from the output to the input of shift register 312 is one digit less than its original value. The output lead 334 from the match circuit 328 is coupled to one input of the AND unit 336. This enables the transmission of a single pulse designated C–621 through the AND unit 336 and the OR unit 322 to the input of shift register 312. This has the effect of increasing the level of the first stage of the shift register by one unit, thereby correcting the erroneous digit.

Figure 15:
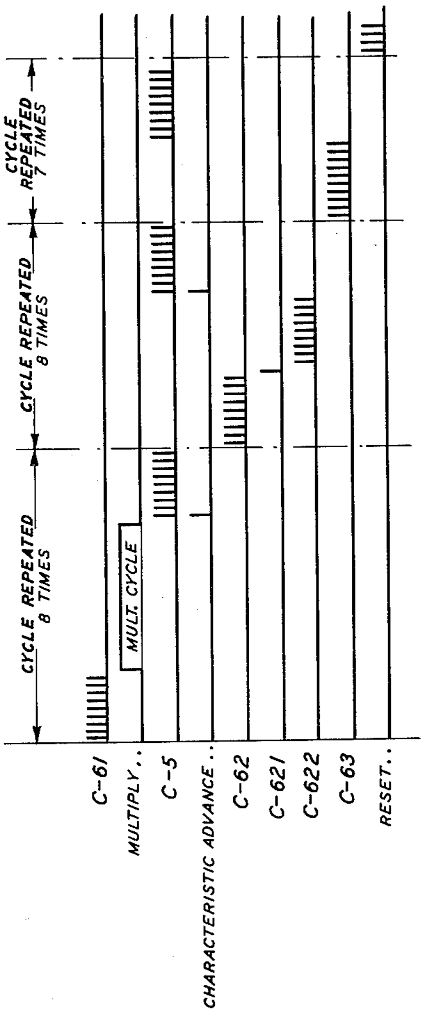
FIG. 15 is a pulse train diagram for the circuit of FIG. 14.

The exact mode of operation of the characteristic generator 338, the multiplier 340, and the associated AND units 342 and 344 will not be considered in detail at this point in view of the fact that their operation is substantially identical with the comparable circuits of FIG. 12. The pulse trains required for the energization of the circuit of FIG. 14 are indicated in the circuit of FIG. 15 with the repetitions of certain sets of pulse trains being as indicated in that figure. Following the correction of digits in the course of the second passage of the eight digits through the shift register 312, the digits are gated to the output lead 346 from the inhibit unit 348 by the application of a series of C-63 pulses on lead 350. The final train of reset pulses indicated in FIG. 15 completes the error correction cycle and resets the ring counter 314 and the flip-flops 316 and 318 to the "0" states.

This basic system can be used in generating a single error correction, double error detecting code which will permit correction of an error of ±1 in any one digit of a code group and will detect, but not correct, an error of ±2 in any one digit, or an error of unity magnitude in any two digits of the code group. This can be done in the above example by limiting ourselves to characteristics whose first digit is one, i.e., the characteristics 100, 111, 110, 101. The code groups are encoded in precisely the same manner as described above for the encoding of the single error correction code groups, except that the word length is reduced from eight digits to four digits because the first four characteristics (200, 211, 210, 201) have been eliminated. In the decoder, the characteristic generator is changed so that the first four characteristics never occur. A double error is indicated if, after the last multiplication pulse train, the quinary ring counter has the state "2" or "3," or if this ring counter has the state "0," and at least one of the two binary ring counters does not have the state "0." Under these circumstances, correction is not normally possible.

As indicated in the preceding paragraph, the amount of error in any one digit or the number of errors in a code group which may be checked may be increased by restricting the choice of characteristics. This has the collateral effect of increasing the ratio of check to message information. For any desired amount of error correction or detection, referring either to the number of errors or magnitudes of errors in each digit, a suitable set of error characteristics may be developed by following the principles and examples set forth in the present description.

Another method for correcting multiple errors of small magnitude in multilevel codes is related to the so-called Reed-Muller codes. These codes are described in a paper by I. S. Reed which appeared at pages 38 through 49 of the I.R.E. Transactions of the Professional Group on Information Theory, volume IT-4, 1954. The Reed-Muller codes for correcting multiple errors are useful because of the simplicity of the decoding apparatus which may be employed. In general, the Reed-Muller codes are "non-systematic," that is, they do not include any of the original information digits, but only signals derived by parity checks performed on the information digits. However, it is often desirable to use checking systems in which the transmitted digits include the original signal information in recognizable form. These requirements can be met by utilizing an encoding system which is based in part on the equivalence of some systematic checking code with each Reed-Muller code, as disclosed by D. Slepian in an article entitled "A Note on Two Binary Signalling Alphabets" which appeared at pages 84 through 86 of the June 1956 issue of the I.R.E. Transactions of the Professional Group on Information Theory, volume IT-2. When such an equivalent code is used, it turns out that the combination of a Reed-Muller decoder followed by a Reed-Muller encoder constitutes a relatively simple error corrector.

One application of the principles described above will now be set forth. Assuming a decimal data link and quinary digital input information, check information may be transmitted by the binary part of some decimal digits. The binary check information is derived systematically by parity checks on the quinary information digits so as to produce a code which is equivalent to a Reed-Muller code. The binary and quinary parts of each decimal digit are combined so that a change of one level in the decimal digit changes only the binary or the quinary part, and successive changes of one unit of the decimal digit alternately change the binary and quinary parts. The error correction circuitry includes the combination of a Reed-Muller decoder and encoder mentioned in the preceding paragraph, and a quinary information recovery circuit for obtaining the original signal input information from the corrected decimal digits. The error corrector must also include suitable circuits for deriving binary signals from the received decimal signals for application to the Reed-Muller circuitry. An indication of the erroneous derived binary signals provides information which may be employed to correct the received decimal signals.

Another illustrative self-checking digital system, including an encoding unit and a companion decoding unit, will now be considered. To introduce the system, the nature of the code which is employed, and the mathematical basis for the encoding and decoding scheme which is utilized will be considered first.

This next system is similar to the system of FIGS. 12 and 14 which has been described above in the use of a decimal (non-prime) system for digit transmission, but it differs from that system in its ability to correct any amount of error in one digit of a code group. This is in contrast with the error correction capacity of the system of FIGS. 12 and 14 which was limited to one unit of error in any one digit. For convenience in referring to the two systems, therefore, the next system to be described will be called the "unlimited" correction system, as contrasted to the "limited" correction system described above.

In the particular illustrative unlimited system which will be described, code groups including a total of twelve decimal digits are employed. The first nine digits are entirely information digits. Digits eleven and twelve contain only check information. Digit number ten is a mixed digit including two levels of check information, with the remaining eight levels being available for the transmission of signal information, as explained in detail hereinafter.

The error characteristics for determining the values of $D_{11}$ and $D_{12}$ are given by the following table:

*Table IV*

| Digit | Error Characteristic | |
|---|---|---|
| | $j=1$ | $j=2$ |
| $D_1$ | 1 | α |
| $D_2$ | 1 | 9 |
| $D_3$ | 1 | 8 |
| $D_4$ | 1 | 7 |
| $D_5$ | 1 | 6 |
| $D_6$ | 1 | 5 |
| $D_7$ | 1 | 4 |
| $D_8$ | 1 | 3 |
| $D_9$ | 1 | 2 |
| $D_{10}$ | 1 | 1 |
| $D_{11}$ | 1 | 0 |
| $D_{12}$ | 0 | 1 |

In the foregoing Table IV, the characteristics are in accordance with the numeration base eleven. For the numeration base eleven, it is necessary to have a single symbol to represent the number ten. The symbol α has been selected to represent the number ten in Table IV and in the following computations which are carried out in the unodecimal (base eleven) system.

In the encoder, digits $D_{11}$ and $D_{12}$ are selected to satisfy the following equation:

$$\Sigma D_i E_{ij} \equiv 0 \pmod{11} \quad (8)$$

For the purpose of calculating the values of $D_{11}$ and $D_{12}$, respectively, Equation 8 may be expanded to form the following two equations:

$$D_1+D_2+D_3+D_4+D_5+D_6+D_7+D_8+D_9+D_{10}+D_{11} \equiv 0 \pmod{11} \quad (9)$$

$$\alpha D_1+9D_2+8D_3+7D_4+6D_5+5D_6+4D_7+3D_8+2D_9+D_{10}+D_{12} \equiv 0 \pmod{11} \quad (10)$$

With reference to Equation 9, it may be noted that it is merely the sum of the digits 1 through 11, because the first digit of each of the error characteristics associated with digits 1 through 11 is "1," and the first digit of the error characteristic associated with digit 12 is "0."

As mentioned above, the input code group is in the form of nine decimal information digits and a tenth digit which can have any value from 0 through 7. The tenth digit as received by the check information encoder may therefore be considered to be an octal digit.

The output code group from the "unlimited" encoder is a group of twelve decimal digits. However, as indicated in Equations 9 and 10, the check digits eleven and twelve are initially computed mod. 11 and therefore might include a symbol "$\alpha$" representing the level ten. This level is not permitted at the output from the check digit encoder.

To avoid this difficulty, the two values of the tenth digit which would make the check digits eleven and twelve, respectively, assume the value "$\alpha$," are designated "forbidden" levels. Referring to Table IV, it may be noted that the error characteristic associated with digit ten is "11." This means that an increase of digit ten by one unit has the effect of decreasing the value of both check digits eleven and twelve by one unit. The output tenth decimal digit is developed from the tenth (octal) input digit by counting from "0" toward the tenth level "9" omitting the forbidden levels which would make check digits eleven or twelve equal to "$\alpha$." Thus, for example, if "3" and "7" were forbidden levels for the tenth output digit, and the tenth input digit had an octal value of "4," then its output value would be "5." In this computation, the level three was omitted, so "5" is the fourth permitted level. Similarly, if the tenth input digit had the maximum level of "7" possible with an octal digit, the output level would be "9."

An example of the formation of the check digits from a given input code group and the decoding of an erroneous code group will now be given. It will be assumed that the first nine input digits are 2 4 7 1 3 0 4 5 6, and that the tenth (octal) digit is "7." The calculation of the check digits makes use of the information set forth in Table IV in addition to the values of the input digits included in the preceding paragraph. Initially, specific values are inserted in Equation 9 as follows:

$$2\cdot1+4\cdot1+7\cdot1+1\cdot1+3\cdot1+0\cdot1+4\cdot1+5\cdot1+6\cdot1+D_{10}\cdot1+D_{11}\cdot1+D_{12}\cdot0\equiv0 \pmod{11} \quad (10a)$$

$$32+D_{10}+D_{11}\equiv0 \pmod{11} \quad (10b)$$

$$D_{10}+D_{11}\equiv1 \pmod{11} \quad (10c)$$

The next step in the calculation is to substitute specific values into Equation 10:

$$2\cdot\alpha+4\cdot9+7\cdot8+1\cdot7+3\cdot6+0\cdot5+4\cdot4+5\cdot3+6\cdot2+D_{10}\cdot1+D_{11}\cdot0+D_{12}\cdot1\equiv0 \pmod{11} \quad (10d)$$

$$180+D_{10}+D_{12}\equiv0 \pmod{11} \quad (10e)$$

$$4+D_{10}+D_{12}\equiv0 \pmod{11} \quad (10f)$$

$$D_{10}+D_{12}\equiv7 \pmod{11} \quad (10g)$$

Table V set forth below lists the 11 possible combinations of $D_{10}$, $D_{11}$, and $D_{12}$ which satisfy the relationships set forth in Equations 10*c* and 10*g*.

*Table V*

| $D_{10}$ | $D_{11}$ | $D_{12}$ |
|---|---|---|
| 0 | 1 | 7 |
| 1 | 0 | 6 |
| 2 | $\alpha$ | 5 |
| 3 | 9 | 4 |
| 4 | 8 | 3 |
| 5 | 7 | 2 |
| 6 | 6 | 1 |
| 7 | 5 | 0 |
| 8 | 4 | $\alpha$ |
| 9 | 3 | 9 |
| $\alpha$ | 2 | 8 |

Of these 11 possible combinations, the third, ninth, and eleventh are disallowed because one of the digits is $\alpha$, which may not be transmitted over the transmission channel. In the following Table VI, the disallowed combinations are omitted, and the allowed combinations are related to the eight possible values of the original octal tenth digit which is designated *y*.

*Table VI*

| $D_{10}$ | $D_{11}$ | $D_{12}$ | $y$ |
|---|---|---|---|
| 0 | 1 | 7 | 0 |
| 1 | 0 | 6 | 1 |
| 3 | 9 | 4 | 2 |
| 4 | 8 | 3 | 3 |
| 5 | 7 | 2 | 4 |
| 6 | 6 | 1 | 5 |
| 7 | 5 | 0 | 6 |
| 9 | 3 | 9 | 7 |

In the present case, with the original octal digit being equal to 7, as set forth above, the combination 9 3 9 for digits $D_{10}$, $D_{11}$, and $D_{12}$ is selected. The complete message, as transmitted, would therefore be as follows: 2 4 7 1 3 0 4 5 6 9 3 9.

Now, it will be assumed initially that the eighth digit is increased by one unit level in transmission from "5" to "6." At the decoder, the operations indicated by Equations 9 and 10 are performed and the error characteristic "13" is obtained. Referring to Table IV, this characteristic immediately identifies digit eight. In addition, the "1" portion of the characteristic determined by Equation 9 indicates that the error was only one unit in magnitude. This is apparent from the fact that the first digit of the error characteristic for digits one through eleven is "1." The error is therefore corrected by reducing the magnitude of the eighth digit by one unit level, from "6" to "5."

It will now be assumed that the eighth digit is mutilated in transmission by four units, from "5" to "9." The resultant corrector term determined at the decoder and corrector is "41." The "4" forming the first part of the corrector term indicates at once that the erroneous digit is in error by four units. To find the critical second digit of the error characteristic as indicated in Table IV, it is necessary to find the integral quotient formed by dividing some mod. 11 ending in "1" by 4. Because the error characteristic is determined by calculations in which the more significant digits of the products and sums are ignored, the more significant digits of the dividend are not known. Starting with 11 mod. 11, it is readily seen that 11 mod. 11 (representing the decimal number 12) gives the integral quotient 3. The desired error characteristic is therefore "13," identifying digit "8" as the erroneous digit.

For machine purposes, the division function described in the preceding paragraph may be performed by successive additions of the corrector term to itself (mod. 11, ignoring carries) until the resultant number has an initial "1". Thus, using our example in which the corrector term is 41, the addition proceeds as follows:

$$\begin{array}{r} 41 \\ +41 \\ \hline 82 \end{array} \quad \text{(base 11, ignoring carries)} \quad (11)$$

$$\begin{array}{r} 82 \\ +41 \\ \hline 13 \end{array} \quad \text{(base 11, ignoring carries)} \quad (12)$$

The first digit of the sum produced by the addition indicated at 12 is a "1." Accordingly, the error characteristic is "13," identifying the eighth digit as the erroneous digit. The rigorous proof of the equivalence of the division and the successive addition methods for determining the error characteristic 13 from the corrector term 41 may be readily developed. However, it is considered sufficient to give the example set forth above, and to note that the equivalence results in part from the fact that the numeration base of eleven is a prime number.

Another equivalent but perhaps more easily understandable explanation of the manner in which the error characteristic "13" is equivalent to the corrector term "41" follows. It is clear from an observation of Equation 9 that an error of one unit in any one of the digits $D_1$ through $D_{11}$ will cause the right-hand side of the equation to be 1 mod. 11; that an error of two units in any one of these digits will cause the right-hand side of the equation to be 2 mod. 11, etc. Therefore, as noted above, the first digit of the error characteristic indicates the number of units of error in one of the digits of the group.

For the case of a corrector term equal to "41," the right-hand side of Equation 9 is 4 mod. 11, indicating an error of four units in one of the digits of the group, and the right-hand side of Equation 10 is 1 mod. 11. The problem then is to determine which of the coefficients of the terms of the left-hand side of Equation 10 would, when multiplied by 4, give a result of 1 mod. 11. A trial and error approach to this problem would soon reveal that only $3\times4=1$ mod. 11. Therefore, the term whose coefficient is 3 is the erroneous one. This term, it is seen, includes $D_8$. Hence, $D_8$, whose single unit error characteristic is "13," is the erroneous digit. Accordingly, the error characteristic "13" and the corrector term "41" are equivalent for errors of one and four units, respectively, in $D_8$.

The nature of the arrangement of Equations 9 and 10 is seen to be such that for the specific case of a corrector term equal to "41" the problem is to find an error characteristic whose multiplication, neglecting carries, by the left-hand one of the digits of the corector is equal to the corrector. Clearly, in the unodecimal number system, $4\times13$ (neglecting carries) = "41."

Figure 16:
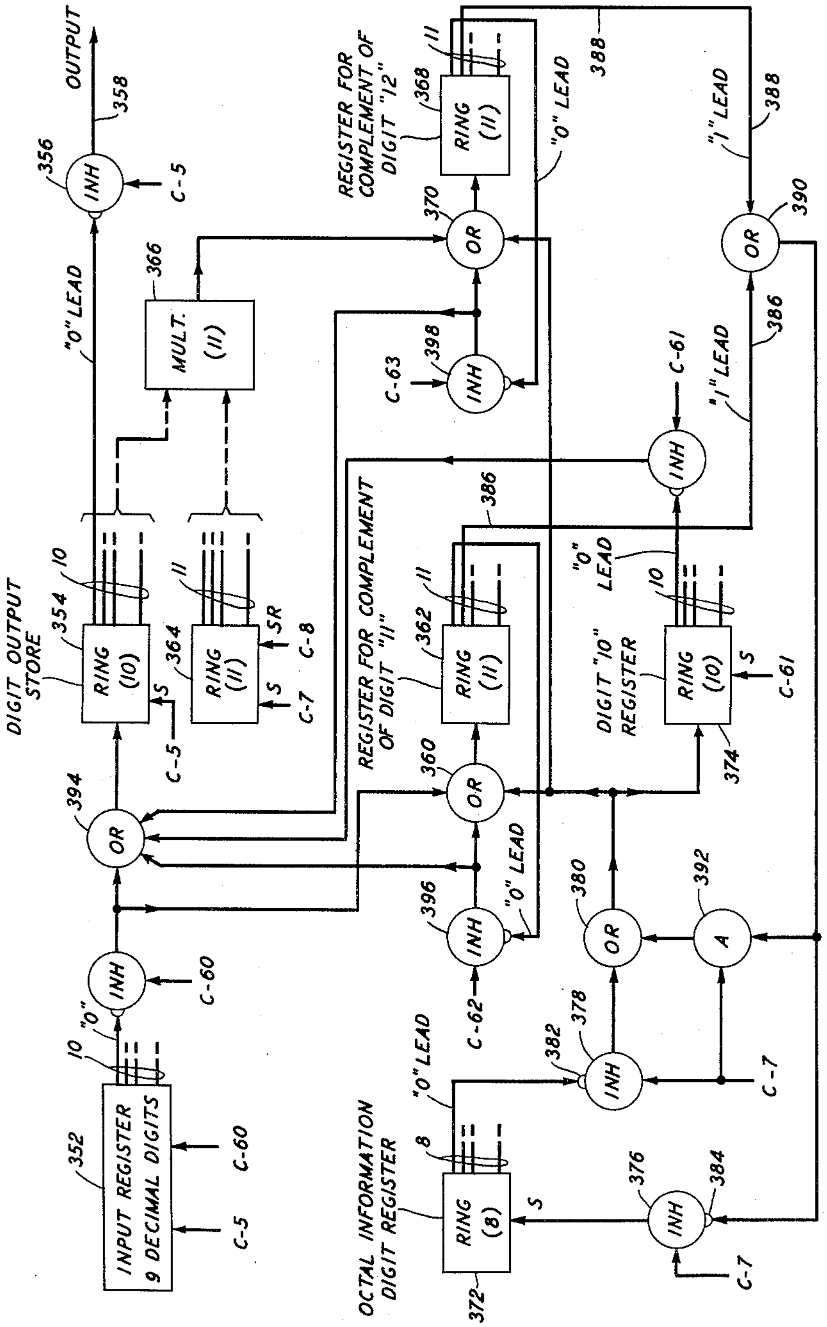
FIG. 16 shows an encoder circuit in accordance with another form of the invention for use in a system in which any amount of error in a given digit may be corrected.

FIG. 16 is an encoder for performing the check digit encoding function described in the preceding paragraphs. The encoder of FIG. 16 could, for example, be used in place of the block 36 of FIG. 2. Referring to FIG. 16, the first nine information digits are registered in the input register 352. They are successively gated through the output ring counter 354 and the inhibit unit 356 to the output lead 358. As they are successively processed through the input register 352, the pulses representing the digits are coupled through the OR unit 360 to the ring counter 362. The ring counter 362 performs the computations indicated by Equation 9, which essentially involves summing the input digits mod. 11.

The function indicated by the Equation 10 set forth above requires the ring counter 364, the multiplier 366, the ring counter 368, and associated circuitry. The second term of the error characteristics for the successive digit, as indicated by the second column of Table IV, is generated by the ring counter 364. It is initially set to the $\alpha$ state (representing the decimal number 10) by the first C–8 pulse, and is successively stepped downward following the gating of each digit through the ring counter 354. The C–8 pulses applied to the subtract (recycle) input of the ring counter 364 are shown in their proper time spacing in FIG. 17. The sum mod. 11 of the successive products indicated in Equation 10 are stored in the ring counter 368. They are applied to ring counter 368 through the OR unit 370.

Figure 17:
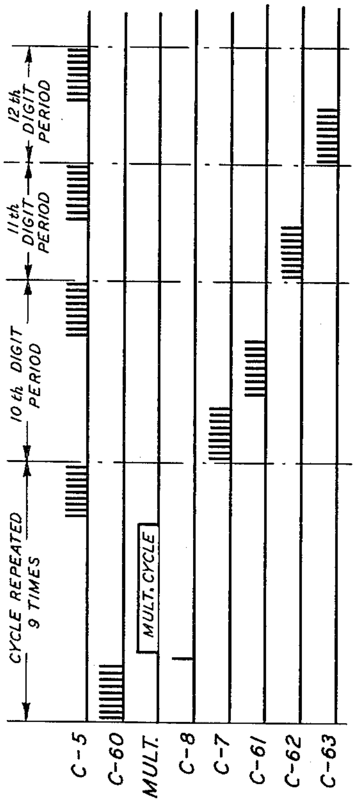
FIG. 17 is a pulse train diagram for the circuit of FIG. 16.

It will now be assumed that the first nine decimal digits have passed through to the output lead 358, and that the sums of the first nine digits as multiplied by the appropriate error characteristic digits are stored in the ring counters 362 and 368. The octal information of the tenth digit is stored in the ring counter 372. The final value of the tenth decimal digit is to be stored in ring counter 374. A transfer of information from ring counter 372 to ring counter 374 is now effected with the forbidden states of digit 10 being skipped through the use of control signals derived from the states of ring counters 362 and 368. Referring to FIG. 17, it may be observed that the pulse train C–7 is a series of nine pulses. These C–7 pulses are applied to the inhibit units 376 and 378. The transfer of signal information from ring counter 372 to the ring counter 374 will first be considered on the basis of ignoring the so-called forbidden states. As C–7 pulses are applied through the inhibit unit 376 to the subtract input lead of ring counter 372, C–7 pulses applied to inhibit unit 378 pass through the OR unit 380 and are applied to ring counter 374. In addition, these pulses are transmitted to the ring counters 362 and 368 by way of the OR units 360 and 370, respectively. When the ring counter 372 is stepped back to the "0" state, however, the inhibiting terminal 382 of the inhibit unit 378 is energized, and further transmission of C–7 pulses is blocked.

The inhibiting terminal 384 of the inhibit unit 376 is provided to permit the advancement of the ring counter 374 through the forbidden states of digit 10 without stepping the ring counter 372 back toward its "0" state. It will be recalled that the digits 11 and 12 cannot be represented by the symbol $\alpha$ (representing the decimal number 10) outside of the check digit encoding system. When the ring counters 362 or 368 are set to the "1" states, the resulting output digit would be "$\alpha$." Accordingly, forbidden states of the decimal digit in register 374 are indicated by the presence of pulses on leads 386 and 388 which are the output leads from the "1" stages of ring counters 362 and 368, respectively. Leads 386 and 388 are connected to the OR unit 390. The output from the OR unit 390 is connected to the inhibiting input terminal 384 of the inhibit unit 376 and to one input of the AND unit 392. Accordingly, when either the ring counter 362 or the ring counter 368 is in the "1" state, C–7 pulses are blocked at the inhibit unit 376. Under these circumstances, the C–7 pulses are not transmitted to the ring counter 372 to step it back toward the "0" state. A C–7 pulse is still transmitted through the inhibit unit 378 and the OR unit 380 to advance the ring counters 362, 368 and 374 by one unit.

The AND unit 392 is required to advance the ring counter 374 by one or two digits in the event that the C–7 pulse which sets the ring counter 372 to the "0" places the ring counter 374 in a forbidden state. Under these circumstances, one or two additional C–7 pulses are gated through the AND unit 392 and the OR unit 380 to advance ring counters 362, 368 and 374 by one or two units. When the ring counters 362 and 368 are stepped past the "1" states, one input lead to the AND unit 392 is de-energized, and no additional C–7 pulses are transmitted from the AND unit 392 to the OR unit 380.

Following the completion of the C–7 train of pulses, the tenth decimal digit is established in ring counter 374 in its final form. Similarly, the complements of digits 11 and 12 are established in the ring counters 362 and 368, respectively. The next step is the successive gating of digits 10, 11, and 12 through to the OR unit 394, the ring counter 354, and ultimately through the inhibit unit 356 to the output lead 358.

The tenth decimal digit is stepped out of the ring counter 374 by a train of C–61 pulses, as indicated in FIG. 17. Following the train of C–61 pulses, a group of nine C–5 pulses is employed to transmit the tenth digit to the output lead 358. The inhibit unit 396 is employed to apply the complement of the number stored in ring counter 362 to the OR unit 394 in the manner set forth above in connection with the ring counter 258 in the encoder of FIG. 12. Similarly, the inhibit unit 398 is the controlling logic unit in the transmission of the complement of the number stored in ring counter 368 to the OR unit 394. The successive application of C–62, C–5, C–63, and a final train of C–5 pulses completes the transmission of digits 11 and 12 from the encoder circuit to the output lead 358.

Figure 19:
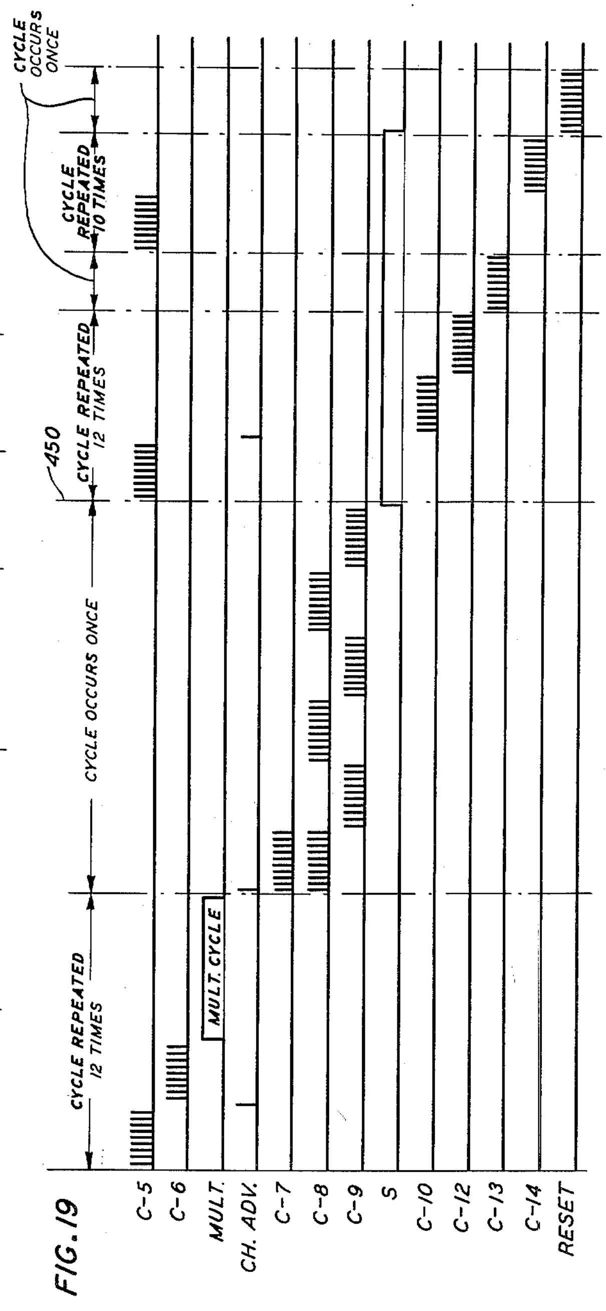
FIG. 19 is the pulse train diagram for the decoder circuit of FIG. 18.
Figure 18:
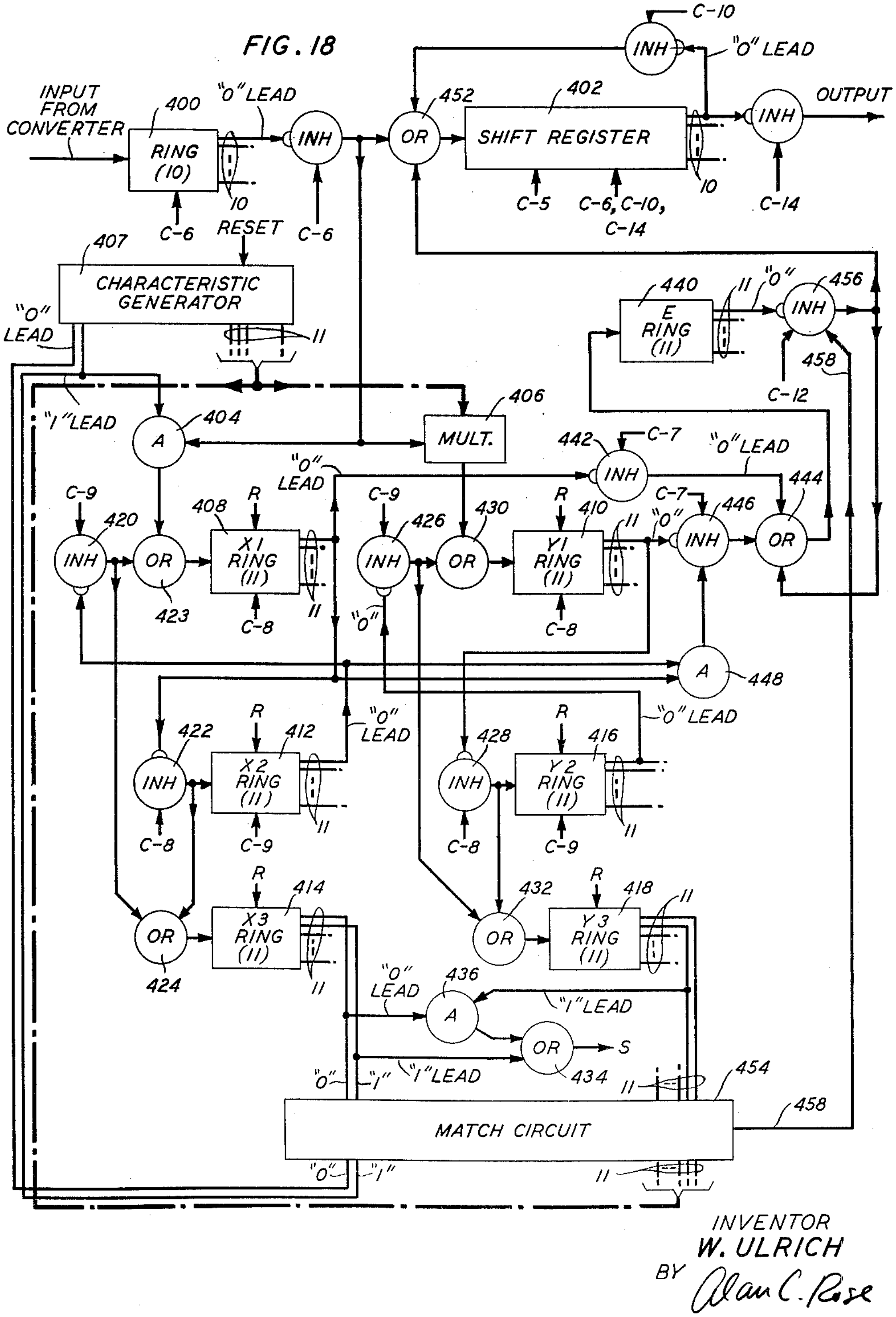
FIG. 18 represents a circuit in accordance with the invention which forms a part of the decoder which may be employed with the encoder of FIG. 16.

The circuit of FIG. 18 is the principal circuit of the companion decoder and corrector for the check digit encoder of FIG. 16. In the circuit of FIG. 18, input pulse trains are received by the ring counter 400 and are coupled to the shift register 402. As the signal information is shifted from the ring counter 400 to the shift register 402, the digital information is coupled to the AND unit 404 and the multiplier 406. The characteristic generator 407 also supplies signals to the AND unit 404 and the multiplier 406, in accordance with the second and third columns, respectively, of Table IV. The characteristic advance signals shown in FIG. 19 are arranged to keep the characteristic generator 407 in step with the digits being processed. Following the transfer of all twelve digits into the shift register 402, the sums indicated by Equations 9 and 10 are stored in the ring counters 408 and 410, respectively. The ring counters 408 and 410 perform the summation functions indicated in detail in Equations 10*a* through 10*c*, and in Equations 10*d* through 10*g*, respectively. In the example set forth above, it was assumed that the eighth digit was increased in transmission by four units from 5 to 9. Accordingly, four extra pulses are received in the eighth digit supplied in pulse form by the ring counter 400. In view of the fact that the characteristic $E_{81}$ associated with the eighth digit is 1, four extra pulses are supplied to the ring counter 408. However, because the error characteristic associated with the eighth digit in Equation 10 is 3, 12 pulses are applied to the ring counter 410 to advance the 11-stage ring counter one unit beyond the 0 position. The corrector term stored in ring counters 408 and 410 is therefore equal to the value of 41 as discussed in some detail above.

In the description accompanying the operations designated 11 and 12 set forth above, a method for deriving the error characteristic from the corrector term by a process of successive additions was set forth. It will be recalled that the method involved adding the corrector term to itself successively, using the base eleven and neglecting carries, until the first digit became "1." In the circuit of FIG. 18, this operation is carried out by the ring counters 412 and 414 for the first digit of the corrector term and by the ring counters 416 and 418 for the second digit of the corrector term. The digital information in the ring counter 408 is shuttled back and forth between the ring counter 408 and the ring counter 412, with the ring counter 414 being advanced each time the digital information is transferred from either one of the ring counters 408 or 412 to the other. This operation is continued until one of the successive additions places the ring counter 414 in the "1" state. The transfer of information between ring counters 410 and 416 is synchronized with the transfer of digits between ring counters 408 and 412, and ring counter 418 is advanced when information is transferred in either direction.

The operation described in the preceding paragraph is accomplished by the inhibit units 420 and 422 and the OR units 423 and 424 associated with the ring counters 408, 412, and 414. Similarly, the inhibit units 426 and 428 and the OR units 430 and 432 are associated with the three ring counters which process the second digit of the error corrector term. Successive trains of C–8 and C–9 pulses as shown in FIG. 19 are applied to the inhibit units 420, 422, 426, and 428, as well as to the appropriate ring counters, to perform the function of shuttling digital information back and forth between the first two ring counters associated with each corrector unit. Pulses are supplied to the ring counter 414 during each resetting of the ring counters 408 and 412 via the OR unit 424. The OR unit 432 performs the same function in routing digital pulses to the ring counter 418 associated with the second digit of the corrector term.

The shuttling operation described above is stopped by the application of control pulses designated "S" which are generated by the OR unit 434 and the AND unit 436. As indicated by the error characteristics set forth in Table IV, a correct error characteristic is produced any time that the first digit of the error characteristic is a "1," or when the first digit of the error characteristic is a "0" and the second digit is a "1." Accordingly, the output S from the OR unit 434 is energized when the input lead from the "1" state of the ring counter 414 is energized. It is also energized when the AND unit 436 is enabled by a pulse from the "0" lead of the ring counter 414 and from the "1" lead from the ring counter 418. As indicated in FIG. 19, the application of an "S" signal to the control signal generator stops the repetition of C–8 and C–9 pulses required for shuttling the error corrector term between the two sets of ring counters.

Following the operations set forth in the preceding paragraphs, the error characteristic indicating the digit in which the error is located is registered in the ring counters 414 and 418. The next step which will be considered is the method of registering the amount of error present in the erroneous digit. This amount of error will be registered in the ring counter 440 in terms of the amount of surpulsage as compared with the original value of the transmitted digit. Thus, if a given digit was increased by four units from "2" to "6," for example, the surpulsage of "4" would be registered in ring counter 440. However, if the digit had been changed from "6" to "2," indicating a reduction in value of 4 units, the error indication in ring counter 440 would be "7." The complement (mod. 11) of the number 7 provides the necessary increment to restore the number 2 to its proper value of 6.

It will be recalled that in general, the first digit of the corrector term indicates the error in the desired form for entering in ring counter 440. Accordingly, the number stored in the ring counter 408 is transferred to the ring counter 440 at the time of the occurrence of the first train of C–8 pulses. This is accomplished by the inhibit unit 442, the OR unit 444, and the connection from the "0" output lead of the ring counter 408 to the inhibiting input terminal of the inhibit unit 442. A pulse train C–7 is applied to a normal input to the inhibit unit 442 simultaneously with the occurrence of the first train of C–8 pulses. The exact relationship between the trains of pulses designated C–7 and C–8 is indicated on the pulse train diagram of FIG. 19. As is customary in the transfer of information in the present circuitry, the ring counter 408 is stepped toward "0," while the ring counter 440 is incremented. When the ring counter 408 reaches the "0" state, the inhibit terminal of inhibiting unit 442 is energized, and no further pulses are applied to ring counter 440. It may be noted that the operation described above occurs simultaneously with the transfer of information from ring counter 408 to ring counter 412, constituting the first step in determining the error characteristic.

In the case of an error in the twelfth digit, it may be observed from the error characteristic 01 associated with $D_{12}$ in Table IV that the corrector term will be 01, or some multiple of this number. Thus, for example, if the corrector term were 04, this would indicate that the twelfth digit was in error by four units. Accordingly, it is the number "4" which would appear in ring counter 410 which should be transferred to ring counter 440. The circuitry provided for transferring the digit from ring counter 410 to ring counter 440 when ring counter 408 initially has the value of "0" will now be discussed.

The circuitry for implementing this transfer includes the inhibit unit 446 and the AND unit 448. A train of C–7 pulses is applied to the inhibit unit 446 simultaneously with its application to the inhibit unit 442. When the ring counter 408 is initially in the "0" state, the output leads from the "0" states of ring counters 408 and 412 are both initially "0," and remain in the "0" state. Under these circumstances, the AND unit 448 supplies an enabling pulse to the inhibit unit 446. C–7 pulses are therefore transmitted through the inhibit unit 446 and the OR unit 444 to increment the ring counter 440 until the ring counter 410 reaches the "0" state.

At this point in the logical description of FIG. 18, the error characteristic is registered in ring counters 414 and 418, and the amount of error in terms of its surplusage over the correct digit is indicated in ring counter 440. Chronologically, the point in the cycle of the circuit of FIG. 18 has been reached which is represented by the vertical dash-dot line 450 in FIG. 19.

The digits are now shifted successively from the output to the input of the shift register 402. As each digit is entered in the first ring counter of the shift register 402, the characteristic generator 407 is advanced one unit. When the characteristic generator output matches the number registered in ring counters 414 and 418, a number of pulses sufficient to correct the erroneous digit is applied to the OR circuit 452 to increment the first ring counter of the shift register 402 to the proper value.

The circuits for implementing the operation described in the preceding paragraph include the matching circuit 454, the inhibit circuit 456, and the OR circuit 444. An enabling signal is applied to lead 458 at the output of the match circuit 454 to identify the erroneous digit. This enabling pulse is applied to one of the normal input leads of the inhibit unit 456. During the period while lead 458 is energized, a series of ten pulses designated C–12 are applied to the other normal input terminal of the inhibit unit 456. The output pulses from inhibit unit 456 are applied both to the OR unit 452 and to the OR unit 444. As mentioned above, those pulses applied to the OR unit 452 are applied to correct the digit information in the first ring counter of shift register 402. The output from the OR unit 444 is connected to the add input of ring counter 440. The ring counter 440 is advanced until it reaches the "0" state, and blocks the output from inhibit unit 456. The output pulses from OR unit 444 are applied to the add input of ring counter 440 to provide correcting pulses equal to the complement mod. 11 of the number registered in ring counter 440. Thus, for example, if a number had been changed from "3" to "5," the number "2" is stored in ring counter 440 indicating a surplusage of "2" over the original number. To change the erroneous number "5" back to "3," it is desirable to step the eleven stage ring counter forward by nine pulses through "0" to the "3" state. It is clear, therefore, that the required correction pulses appearing at the output of inhibit unit 456 constitute the complement mod. 11 of the number originally stored in ring counter 440. The resultant series of decimal digits stored in the shift register 402 is now identical with the group of decimal digits which appeared at the output of the encoder circuit of FIG. 16.

Figure 20:
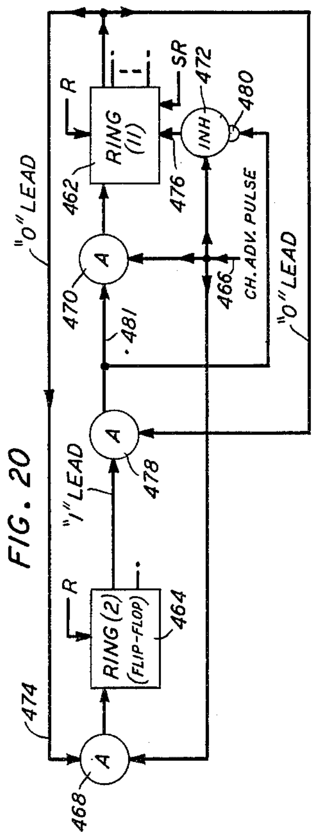
FIGS. 20 and 21 are additional circuit diagrams employed in connection with the decoder circuitry of FIG. 18.

FIG. 20 shows the circuit for the characteristic generator 407 of FIG. 18. The two principal components of the characteristic generator of FIG. 20 are the ring counter 462 and the ring counter 464. The circuit of FIG. 20 is designed to yield the error characteristics shown in Table IV. The ring counters 462 and 464 are initially in the "0" states. As indicated in FIG. 19, a channel advance pulse occurs immediately before each train of C–6 pulses. Referring to FIG. 20, the channel advance pulse is applied on lead 466 to the AND units 468 and 470 and to a normal input of the inhibit unit 472. The successive states indicated by the rows in Table IV correspond to the successive states of the characteristic generator of FIG. 20 following the occurrence of each successive channel advance pulse. Thus, with ring counters 462 and 464 initially in the "0" state by virtue of the final reset signal, the next channel advance pulse places the flip-flop 464 in the "1" state and the ring counter 462 in the $\alpha$ state. Referring first to the circuit for energizing the flip-flop 464, it may be noted that the "0" lead of the ring counter 462 is connected to input lead 474 to the AND unit 468. Accordingly, upon the occurrence of a channel advance pulse on input lead 466, the other input to the AND unit 468 is energized, and the flip-flop 464 is set to the "1" state. The channel advance pulse is applied to the subtract recycle input 476 of the ring counter 462 through the inhibit unit 472. The output from the AND unit 478 controls the energization of the inhibiting input terminal 480 of the inhibit unit 472. In view of the fact that one of the inputs to the AND unit 478 is connected to the "1" output lead of flip-flop 464, however, the inhibiting input terminal 480 of the inhibit unit is not energized, and the channel advance pulse is therefore passed through the inhibit unit 472, as mentioned above.

Each subsequent channel advance pulse sets the ring counter 462 back one state, thus indicating in succession the digits $D_1$ through $D_{11}$, as indicated in Table IV. Upon the occurrence of the twelfth channel advance pulse, the flip-flop 464 is still in the "1" state, and the ring counter 462 has been set back to the "0" state. With ring counter 462 in the "0" state, input lead 474 to the AND unit 468 is energized, and the next successive channel advance pulse sets the flip-flop 464 to the "0" state. When ring counter 462 is in the "1" state and ring counter 462 is in the "0" state, both inputs to the AND unit 478 are energized. The inhibit unit 472 therefore has its inhibit terminal 480 energized, and the enabling input lead 481 to the AND unit 470 is also energized. The twelfth channel advance pulse is therefore coupled to the add input of the ring counter 462, and this ring counter is therefore stepped up to the "1" state. The desired error characteristic of "01," indicating the twelfth digit, has therefore been produced.

Figure 21:
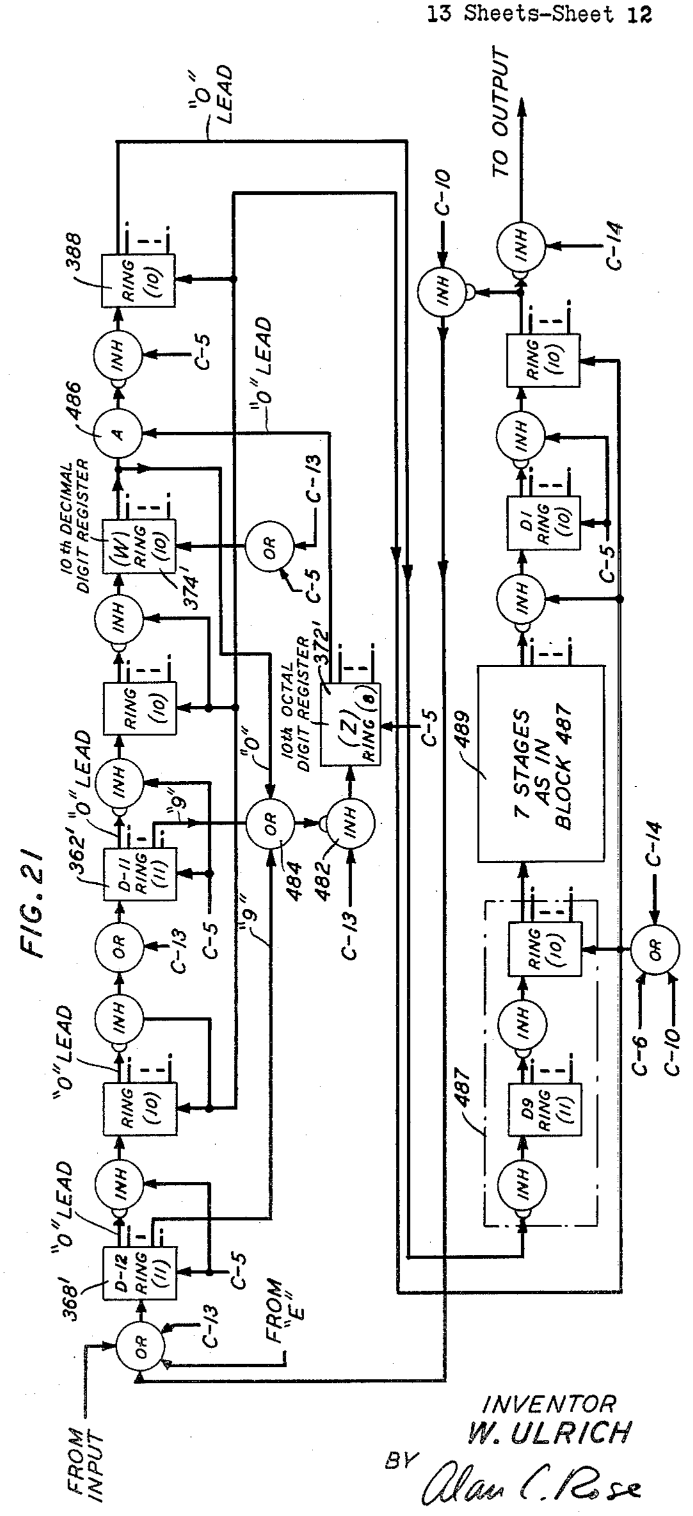

FIG. 21 shows a portion of the shift register 402 of FIG. 18 in detail. It may be recalled that the original tenth information digit is an octal digit, and that it was changed to a decimal digit which included some necessary checking information in the encoder of FIG. 16. The circuitry of FIG. 21 is designed to recover the original octal information digit. The circuit of FIG. 21 operates in the inverse manner as compared with the encoder of FIG. 16. Accordingly, the operation of the circuit of FIG. 16 in regard to the encoding of the tenth decimal digit will be reviewed briefly.

With reference to FIG. 16, it is again noted that the original octal information digit is stored in ring counter 372. It is transferred to ring counter 374, which is to register the tenth decimal digit. The ring counters 362 and 368 store the complements of digits 11 and 12, respectively. In the course of the transfer of digits from the octal information register 372 to the decimal register 374, the ring counters 362 and 368 were incremented simultaneously with the application of pulses to ring counter 374. This effectively reduced the final value of digits 11 and 12 (as required by Equations 9 and 10), in view of the fact that the complements of digits 11 and 12 are stored in ring counters 362 and 368. Every time ring counter 362 or ring counter 368 assumes a forbidden state or one which would produce a final digit 11 or 12 equal to $\alpha$, the ring counter 374 is incremented once without changing the state of the octal information digit register 372. Accordingly, the number finally registered in ring counter 374 differs from that originally set in the ring counter 372 by the number of forbidden states through which the ring counters 362 and 368 have passed.

In FIG. 21, the tenth decimal digit as transmitted is stored in the register 374′, the final tenth octal information digit is stored in ring counter 372′, and the eleventh and twelth decimal check digits are stored in registers 362′ and 368′, respectively. It is clear, by analogy with the encoding circuit of FIG. 16, that in the transfer of information from register 374′ to register 372′ in FIG. 21, the final number in register 372′ must be less than that stored in register 374′ by the number of forbidden states which were traversed in the encoder of FIG. 16.

It may also be noted that there is no further need to store digits $D_{11}$ or $D_{12}$, as these are check digits.

Now, considering the example discussed above in connection with Tables IV and V. the digits 9, 3, and 9 are stored in ring counters 368′, 362′, and 374′. It may be recalled that the original tenth octal digit was 7; therefore, the tenth decimal digit, which is a 9 must be reduced by two units in the transfer from register 374′ to register 372′. The operation performed by the circuit of FIG. 21 corresponds to stepping backward from level 939 in Table V to the top level, in which digit $D_{10}$ is 0. The successive steps are counted, with certain exceptions, and the resulting number is registered in the tenth octal digit register 372 of FIG. 21. It may be recalled that the steps to a level including $\alpha$ for digits $D_{11}$ and $D_{12}$ were omitted in Table VI, resulting in the value of 9 for digit $D_{10}$ as compared with the value of 7 for the original octal tenth digit. Accordingly, in stepping backward through Table V from level 939, the steps leading to forbidden levels, in which digits $D_{11}$ or $D_{12}$ are equal to $\alpha$, must not be accompanied by the application of a pulse to ring counter 372′.

The stepping operation described above is accomplished by the application of a train of ten C–13 pulses to advance ring counters 368′ and 362′ and to step ring counter 374′ backward. C–13 pulses are also applied to inhibit unit 482 to advance ring counter 372′. The stepping of ring counter 372′ is halted whenever a signal is applied from the OR unit 484 to the inhibiting input terminal of inhibit unit 482. When either of ring counters 368 or 362′ is in the "9" state, the OR unit 484 provides an output pulse to block the corresponding C–13 pulse which would otherwise pass through inhibit unit 482. With reference to Table V, the transitions which do not advance ring counter 372′ are those from level 939 to 84$\alpha$ and from 394 to 2$\alpha$5. It may be observed, therefore, that no pulse is applied to counter 372′ when either counter 368′ or 362′ is entering a "forbidden" state. When the ring counter 10 reaches the 0 level, a permanent blocking signal is applied to the inhibit terminal of the inhibit unit 482. By counting the allowed transitions in Table V from level 939 back to level 017, it may be seen that the number registered in ring counter 272′ has the proper value of 7.

The AND unit 486 is employed to parallel the outputs of ring counters 374′ and 372′ to the input of the next subsequent ring counter 388. The two input leads to the AND unit 486 are connected from the "0" states of ring counters 372′ and 374′. With one of these two ring counters always being set to the "0" state, the energization state of the other ring counter controls the output from the AND unit 486. The remaining circuit elements in the shift register shown in FIG. 21 include the ring counter stages such as are shown in block 487 and indicated by block 489. They are conventional circuit components which have been described above in connection with other circuits. Accordingly, further description of these elements will not be repeated at this point.

Figure 22:
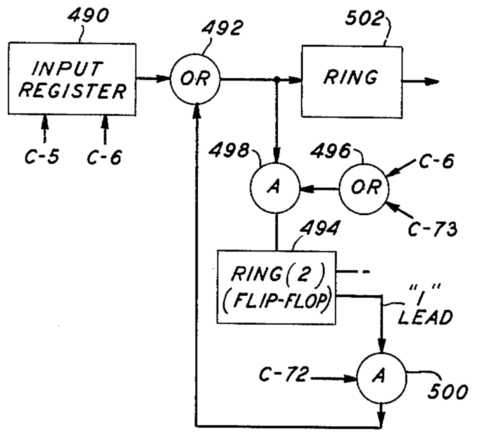
FIG. 22 is a circuit diagram of a simple error detection circuit in accordance with the invention in which checking and signal information are combined in a single mixed digit.

FIG. 22 is a simplified circuit which may be also employed in place of the block 36 of FIG. 2. The circuit of FIG. 22 is a check information encoder which merely permits the detection of errors and not the correction of errors. In operation, the code groups applied to the encoder of FIG. 22 may include any desired number of decimal digits, and then a final digit including only quinary information. The encoder is designed to make the sum of the digits in the entire code group either an odd or an even number. In the specific circuit of FIG. 22, the encoder is set to make the resultant code group an even number.

Figure 23:
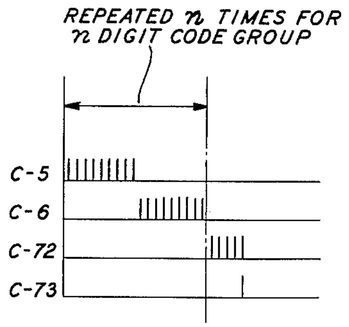
FIG. 23 is a pulse train diagram for the circuit of FIG. 22.

The circuit of FIG. 22 includes the input register 490, the OR unit 492, and the flip-flop 494. As indicated in FIG. 23, signals are shifted along the input register by means of the pulse trains C–5 and C–6. Pulses are shifted out of the final ring counter in the input register 490 by a train of nine C–6 pulses. The C–6 pulses are also applied through the OR unit 496 to the AND unit 498 to gate pulses from the register 490 through to the flip-flop 494. Assuming that the flip-flop is initially in "0" state, it will be in the "1" state following the passage of the final quinary digit through the OR unit 492 if the sum of the digits is odd. Under these circumstances, the train of five C–72 pulses is gated through the AND unit 500 and the OR unit 492 to the ring counter 502 in which the quinary digit is stored. This changes the digit stored in ring counter 502 from an odd to an even number or vice versa as required to produce the required even sum. A final C–73 pulse is provided to reset flip-flop 494 to the "0" state if its final state was the "1" state. This is accomplished by timing of the C–73 pulses to coincide with the final pulse of the train of C–72 pulses. With this arrangement, the C–73 pulse is transmitted through the AND unit 498 only if the ring counter 494 had a terminal "1" state.

Figures 24, 25:
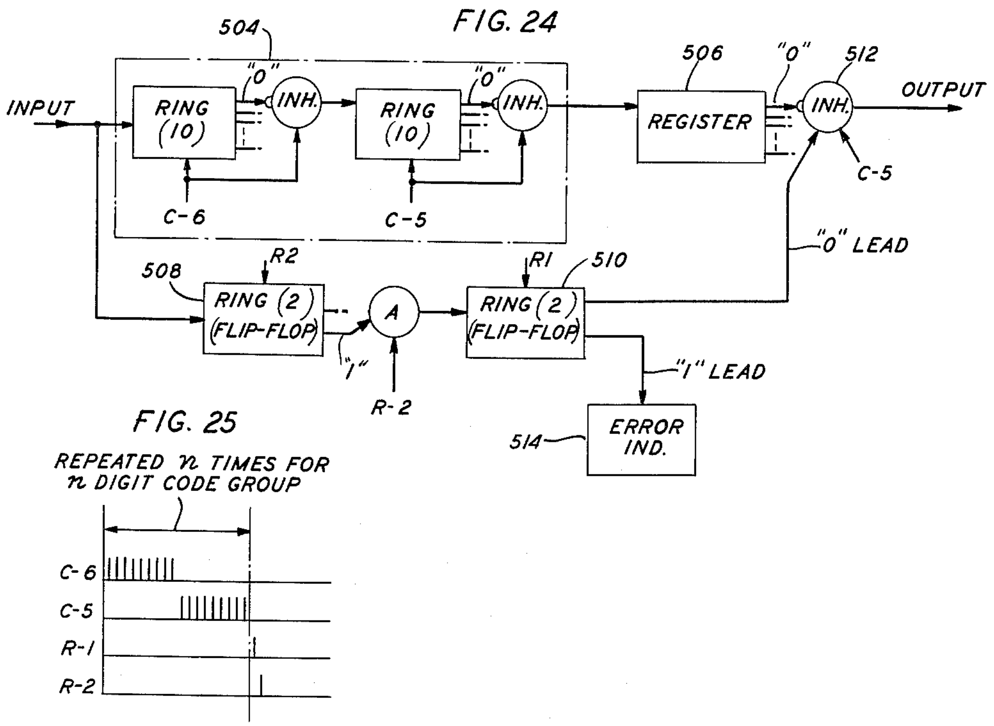
FIG. 24 is the error detection circuit in accordance with the invention which is to be employed with the encoder of FIG. 22.
FIG. 25 is a pulse train diagram for the error detection circuit of FIG. 24.

The decoder for the parity check encoder of FIG. 22 is shown in FIG. 24. The pulse trains required for energizing the circuit of FIG. 24 are shown in the pulse diagram of FIG. 25. The circuit of FIG. 24 is quite simple, and essentially includes only the shift register blocks indicated at 504 and 506, the flip-flops 508 and 510, and the final inhibit unit 512. If the output of the second flip-flop 510 does not give the desired parity check, the "1" output lead will be energized and the "0" output lead will be de-energized. The "1" output lead from flip-flop 510 is connected to any desired type of error indicator 514, and the "0" output lead is coupled to a normal input of the inhibit unit 512. Accordingly, if the output signal does not satisfy the required parity check, the error indicating device is energized and the transmitted code groups are not gated out of the shift register.

It is to be understood that the above-described arrangements are illustrative of the application of the principles of the invention. Numerous other arrangements may be devised by those skilled in the art without departing from the spirit and scope of the invention.

What is claimed is:

1. In a data processing system in which each digit is represented by at least three distinct states, a code group transmitter including means for providing at least one signal representing digital input information, means for providing at least one signal representing checking information, and means for providing at least one mixed digital signal including both input and checking information; and a decoder coupled to detect code group signals originated by said transmitter, said decoder including means for separating the input and checking information included in said mixed signal, and means for detecting errors in said code group signals.

2. In combination, a digital data handling circuit for digital information signals having a numeration base greater than two, means for supplying original input information code group signals including a first digit signal containing as much information as the code representing said digit is capable of bearing and at least one digit signal having less information than the code representing said digit is capable of bearing, means for systematically developing digital check information signals from said code group signals, means for modifying only said one digit signal by adding at least a portion of said check information signals to the available information bearing levels of said one digit signal, and means for applying the code groups including some of said original input signals and said modified signal to said data handling circuit.

3. In a checking arrangement for a digital data handling system, means for supplying input information code group signals representing digits in a non-prime numeration system, means for multiplying each digit represented by said code group signals by each of at least two distinct error characteristic signals in accordance with two different prime numeration bases and neglecting carries, means for summing the resulting products, means for forming digital check signals indicating the result of said summing operation, means for converting said check signals to said non-prime numeration system and combining them with said original input information code group signals, and a data handling circuit for digital signals having said non-prime base connected to said conversion means.

4. In combination, means providing digital information code group signals representing digits in terms of a factorable numeration base, means for deriving digital check information signals from said information code group signals by the multiplication of the digits in said code group by respectively different error characteristic terms in accordance with a prime numeration base larger than said factorable base, means for converting said check information signals into said factorable numeration base and for combining them with said original code group signals to produce checked code group signals, means for recomputing said check information signals in accordance with said prime numeration base from said check code group to obtain error characteristic signals, and means for reconstituting the original information code group signals from said checked code group signals in accordance with said error characteristic signals.

5. In a self-correcting data processing system, means for representing digits by code signals including at least three distinct states for each digit, means for converting each of said digital representations into a pulse train, encoding means for multiplying each train of pulses by a plurality of distinct predetermined error characteristic factors and summing the resulting products, means for developing check information signals from the resultant sums, and means for adding the check information signals to the pulse training representations.

6. In a self-correcting digital data system, means for representing digits by code signals having a predetermined numeration base and including at least three distinct states for each digit, means for providing signals representing a plurality of individual error characteristic factors for each digit each of said error characteristic factors being different from the error characteristic factor associated with other digits and from the complements thereof, means for multiplying said error characteristic factors and said digits in accordance with a different numeration base and summing the results, means for developing check information signals from the resultant sums, and means for combining said check information signals with the original digital code signals.

7. In combination, a digital data handling circuit including means for representing digits in accordance with a non-prime numeration base; a source of input information signals; input and output error checking circuitry including means for computing error checking information signals in accordance with a prime numeration base and in accordance with at least two equations of the following form:

$$\Sigma D_i E_{ij} \equiv Z_j (\text{mod. } q_j)$$

wherein $D_i$ represents code group digits, $E_{ij}$ represents the error characteristic term associated with the $i^{th}$ digit of the code group and the $j^{th}$ digit of the error characteristic, $Z_j$ is an arbitrary digit, and (mod. $q_j$) indicates that the algorithm is to be performed according to the numeration base $q_j$ with carries being ignored; means for combining said input information and said checking signals and applying these in multivalued form to said data handling circuit; and means for coupling signals from said data handling circuit to said output error checking circuitry.

8. In combination: means for providing digital input information code group signals; means for providing signals representing error characteristic digits $E_{ij}$ associated with each digit of said code group which are different from the error characteristic digits and the complement of the error characteristic digits of every other digit of the code groups, some of the error characteristics being multiples of other error characteristics; means for developing digital check signals from said digital information signals in accordance with at least two equations of the following form:

$$\Sigma D_i E_{ij} \equiv Z_j (\text{mod. } q_j)$$

wherein $D_i$ represents code group digits, $E_{ij}$ represents the error characteristic term associated with the $i^{th}$ digit of the code group and the $j^{th}$ digit of the error characteristic, $Z_j$ is an arbitrary digit, and (mode $q_j$) indicates that the algorithm is to be performed according to the numeration base $q_j$ with carries being ignored; and means for combining said digital check signals and said digital information signals to form output code group signals.

9. In combination, means for providing input signals, each having one of at least three possible states to represent the digits of an information signal code group, the number of states of each digit determining a first numeration base, means for multiplying each information digit by a plurality of error characteristic coefficients in accordance with a numeration base which is different from said first numeration base, means for summing the resultant products means for developing check information signals from the resultant sums, and means for combining the check information signals with the original input signals to produce checked code group signals in which each digit is represented by one of at least three possible states.

References Cited in the file of this patent

UNITED STATES PATENTS

| | | |
|---|---|---|
| Re. 23,601 | Hamming et al. | Dec. 23, 1952 |
| 2,596,199 | Bennett | May 13, 1952 |
| 2,674,727 | Spielberg | Apr. 6, 1954 |
| 2,719,959 | Hobbs | Oct. 4, 1955 |
| 2,731,199 | Ghertman et al. | Jan. 17, 1956 |
| 2,754 054 | Helmig et al. | July 10, 1956 |
| 2,765,982 | Knutsen | Oct. 9, 1956 |
| 2,776,091 | Chenus | Jan. 1, 1957 |
| 2,805,824 | Knutsen | Sept. 10, 1957 |

FOREIGN PATENTS

| | | |
|---|---|---|
| 747,870 | Great Britain | Apr. 18, 1956 |